US012347975B2

(12) United States Patent
Yao et al.

(10) Patent No.: US 12,347,975 B2
(45) Date of Patent: Jul. 1, 2025

(54) ELECTRICAL CONNECTOR AND ASSEMBLY THEREOF WITH MATING ELASTIC ARMS FOR PRESSING AGAINST CIRCUIT BOARD

(71) Applicant: DONGGUAN LUXSHARE TECHNOLOGIES CO., LTD, Dongguan (CN)

(72) Inventors: Kunlin Yao, Dongguan (CN); Rongzhe Guo, Dongguan (CN)

(73) Assignee: DONGGUAN LUXSHARE TECHNOLOGIES CO., LTD, Dongguan (CN)

(*) Notice: Subject to any disclaimer, the term of this patent is extended or adjusted under 35 U.S.C. 154(b) by 451 days.

(21) Appl. No.: 17/964,331

(22) Filed: Oct. 12, 2022

(65) Prior Publication Data

US 2023/0223722 A1 Jul. 13, 2023

(30) Foreign Application Priority Data

Jan. 11, 2022 (CN) ......................... 202210025105.7

(51) Int. Cl.
*H01R 13/6471* (2011.01)
*H01R 12/57* (2011.01)
(Continued)

(52) U.S. Cl.
CPC ......... *H01R 13/6471* (2013.01); *H01R 12/57* (2013.01); *H01R 13/2407* (2013.01); *H01R 13/502* (2013.01); *H01R 13/516* (2013.01)

(58) Field of Classification Search
CPC ................ H01R 13/6471; H01R 12/57; H01R 13/2407; H01R 13/502; H01R 13/516;
(Continued)

(56) References Cited

U.S. PATENT DOCUMENTS

| | | | | |
|---|---|---|---|---|
| 9,843,135 | B2 * | 12/2017 | Guetig | H01R 13/665 |
| 2009/0305530 | A1 * | 12/2009 | Ito | H01R 13/447 439/80 |

(Continued)

FOREIGN PATENT DOCUMENTS

| | | | |
|---|---|---|---|
| CN | 111682368 | A | 9/2020 |
| CN | 111682369 | A | 9/2020 |

(Continued)

*Primary Examiner* — Abdullah A Riyami
*Assistant Examiner* — Nader J Alhawamdeh
(74) *Attorney, Agent, or Firm* — Birch, Stewart, Kolasch & Birch, LLP

(57) ABSTRACT

An electrical connector, for being mounted on a circuit board, includes a metal shell and a terminal module. The metal shell includes a mounting surface to be matched with the circuit board. The terminal module includes a number of conductive terminals, an insulating block, a ground shielding piece and a number of cables. The conductive terminals include a number of pairs of differential signal terminals, a number of first ground terminals, and a number of second ground terminals. The ground shielding piece connects the first ground terminals and the second ground terminals in series. Each conductive terminal includes a mating elastic arm extending beyond the mounting surface. The mating elastic arm includes a contact portion for pressing against a conductive pad of the circuit board, thereby improving the installation convenience of the electrical connector.

20 Claims, 24 Drawing Sheets

(51) Int. Cl.
*H01R 13/24* (2006.01)
*H01R 13/502* (2006.01)
*H01R 13/516* (2006.01)

(58) Field of Classification Search
CPC ................ H01R 12/714; H01R 12/716; H01R 13/2442; H01R 12/79; H01R 13/6594; H01R 13/05; H01R 12/71; H01R 13/652; H01R 13/6591
See application file for complete search history.

(56) References Cited

U.S. PATENT DOCUMENTS

| | | | | |
|---|---|---|---|---|
| 2020/0381869 | A1* | 12/2020 | Long | H01R 13/6587 |
| 2021/0075143 | A1* | 3/2021 | Laurx | H01R 13/405 |
| 2021/0126402 | A1* | 4/2021 | Zhang | H01R 12/716 |
| 2021/0399449 | A1* | 12/2021 | Guo | H01R 13/6471 |
| 2023/0187862 | A1* | 6/2023 | Lin | H01R 13/6582 439/61 |
| 2023/0223722 | A1* | 7/2023 | Yao | H01R 12/714 439/108 |
| 2025/0023265 | A1* | 1/2025 | Cheng | H01R 12/716 |
| 2025/0055231 | A1* | 2/2025 | Cheng | H01R 12/737 |

FOREIGN PATENT DOCUMENTS

| | | | |
|---|---|---|---|
| CN | 112636094 | A | 4/2021 |
| CN | 112636100 | A | 4/2021 |
| CN | 112886340 | A | 6/2021 |

* cited by examiner

ELECTRICAL CONNECTOR AND ASSEMBLY THEREOF WITH MATING ELASTIC ARMS FOR PRESSING AGAINST CIRCUIT BOARD

CROSS-REFERENCE TO RELATED APPLICATION

This patent application claims priority of a Chinese Patent Application No. 202210025105.7, filed on Jan. 11, 2022 and titled "ELECTRICAL CONNECTOR AND ASSEMBLY THEREOF", the entire content of which is incorporated herein by reference.

TECHNICAL FIELD

The present disclosure relates to an electrical connector and an assembly thereof, which belongs to a technical field of connectors.

BACKGROUND

Some existing electrical connectors in the relevant art include a shell and a plurality of conductive terminals. The shell includes a mounting surface. Each conductive terminal includes a mounting foot extending beyond the mounting surface. Each mounting foot includes a fish-eye shaped through hole, so that the mounting foot has certain elasticity. The mounting feet of the conductive terminals are adapted for being pressed into conductive through holes of a circuit board, so as to realize the electrical connection between the electrical connector and the circuit board. However, this design increases the difficulty of mounting the mounting feet and pressing them into the circuit board as the terminal density continues to increase. In addition, the maintainability of such electrical connectors is poor. Once the mounting feet are pressed into the conductive through holes of the circuit board, it is difficult to replace the electrical connector.

SUMMARY

An object of the present disclosure is to provide an electrical connector and an assembly thereof which are relatively easy to be mounted to a circuit board by providing mating elastic arms.

In order to achieve the above object, the present disclosure adopts the following technical solution: an electrical connector for being mounted on a circuit board, the electrical connector including: a metal shell including a mounting surface for mating with the circuit board; and a terminal module fixed to the metal shell, the terminal module including a plurality of conductive terminals, an insulating block fixing the plurality of conductive terminals, a ground shielding piece at least partially received in the insulating block, and a plurality of cables connected to the conductive terminals; wherein the plurality of conductive terminals include a plurality of pairs of differential signal terminals, a plurality of first ground terminals and a plurality of second ground terminals, opposite sides of each pair of differential signal terminals are associated with one of the first ground terminals and one of the second ground terminals, respectively; the ground shielding piece connects the plurality of first ground terminals and the plurality of second ground terminals in series; and wherein each conductive terminal includes a mating elastic arm protruding beyond the mounting surface, and the mating elastic arm includes a contact portion for pressing against a corresponding conductive pad of the circuit board.

In order to achieve the above object, the present disclosure adopts the following technical solution: an electrical connector assembly, including: an electrical connector including: a metal shell including a mounting surface; and a terminal module fixed to the metal shell, the terminal module including a plurality of conductive terminals, an insulating block fixing the plurality of conductive terminals, a ground shielding piece at least partially received in the insulating block, and a plurality of cables connected to the conductive terminals; and a circuit board on which the electrical connector is mounted, the circuit board including a plurality of conductive pads, the plurality of conductive pads including a plurality of pairs of differential signal conductive pads and a plurality of frame-shaped grounding pads, a periphery of each pair of differential signal conductive pads being surrounded by one frame-shaped grounding pad, the plurality of frame-shaped grounding pads are connected as a whole; wherein the plurality of conductive terminals include a plurality of pairs of differential signal terminals, a plurality of first ground terminals and a plurality of second ground terminals, opposite sides of each pair of differential signal terminals are associated with one of the first ground terminals and one of the second ground terminals, respectively; the ground shielding piece connects the plurality of first ground terminals and the plurality of second ground terminals in series; wherein each conductive terminal includes a mating elastic arm protruding beyond the mounting surface, and the mating elastic arm includes a contact portion; and wherein the contact portions of the pair of differential signal terminals press against corresponding differential signal conductive pads, and the contact portions of the first ground terminal and the second ground terminal press against a corresponding frame-shaped grounding pad.

In order to achieve the above object, the present disclosure adopts the following technical solution: an electrical connector assembly, including: an electrical connector including: a metal shell including a mounting surface; and a terminal module fixed to the metal shell, the terminal module including a plurality of conductive terminals, an insulating block fixing the plurality of conductive terminals, and a plurality of cables connected to the plurality of conductive terminals; and a circuit board including a plurality of conductive pads; wherein the plurality of conductive terminals include a plurality of pairs of differential signal terminals, a plurality of first ground terminals and a plurality of second ground terminals; opposite sides of each pair of differential signal terminals are associated with one of the first ground terminals and one of the second ground terminals, respectively; each conductive terminal includes a mating elastic arm protruding beyond the mounting surface, and the mating elastic arm includes a contact portion; wherein the plurality of conductive pads include a plurality of pairs of differential signal conductive pads and a plurality of frame-shaped grounding pads, a periphery of each pair of differential signal conductive pads is surrounded by one frame-shaped grounding pad, the plurality of frame-shaped grounding pads are connected as a whole, the contact portions of the pair of differential signal terminals press against corresponding differential signal conductive pads, and the contact portions of the first ground terminal and the second ground terminal press against a corresponding frame-shaped grounding pad.

Compared with the prior art, the present disclosure improves the shielding performance of the electrical connector by providing a ground shielding piece connecting the plurality of first ground terminals and the second ground terminals in series. In addition, by providing the mating elastic arms, and the contact portions of the mating elastic arms pressing against the conductive pads of the circuit board, the convenience of installing the electrical connector on the circuit board is improved, and the subsequent maintenance of the electrical connector is facilitated.

DETAILED DESCRIPTION

Figure 1:
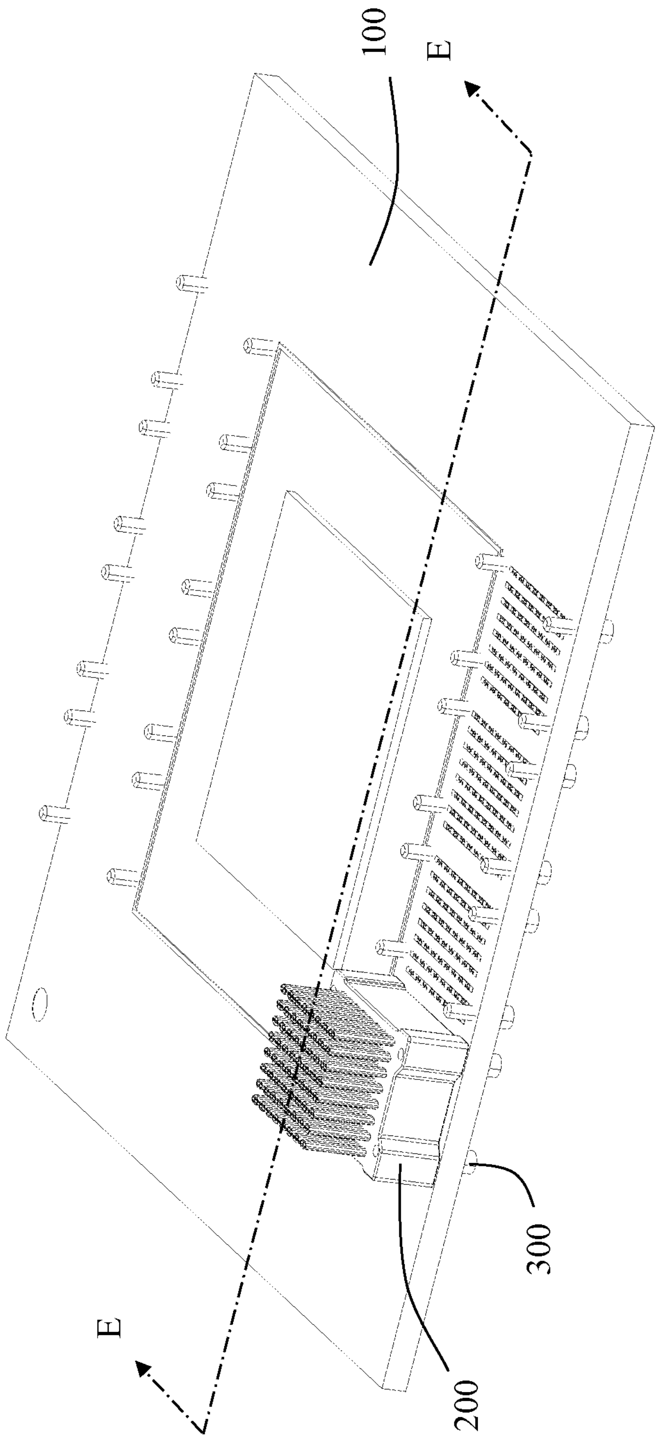
FIG. 1 is a schematic perspective view of an electrical connector assembly in accordance with an embodiment of the present disclosure.
Figure 2:
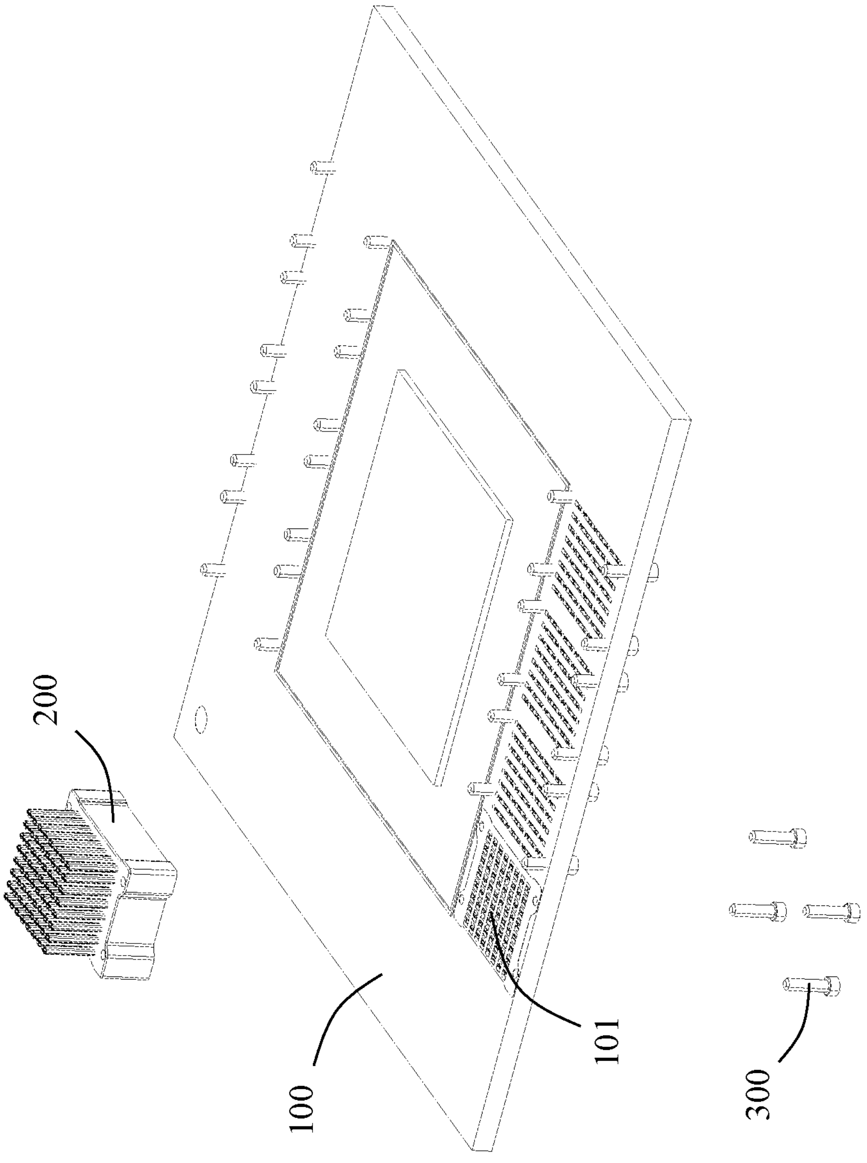
FIG. 2 is a partial perspective exploded view of FIG. 1.
Figure 3:
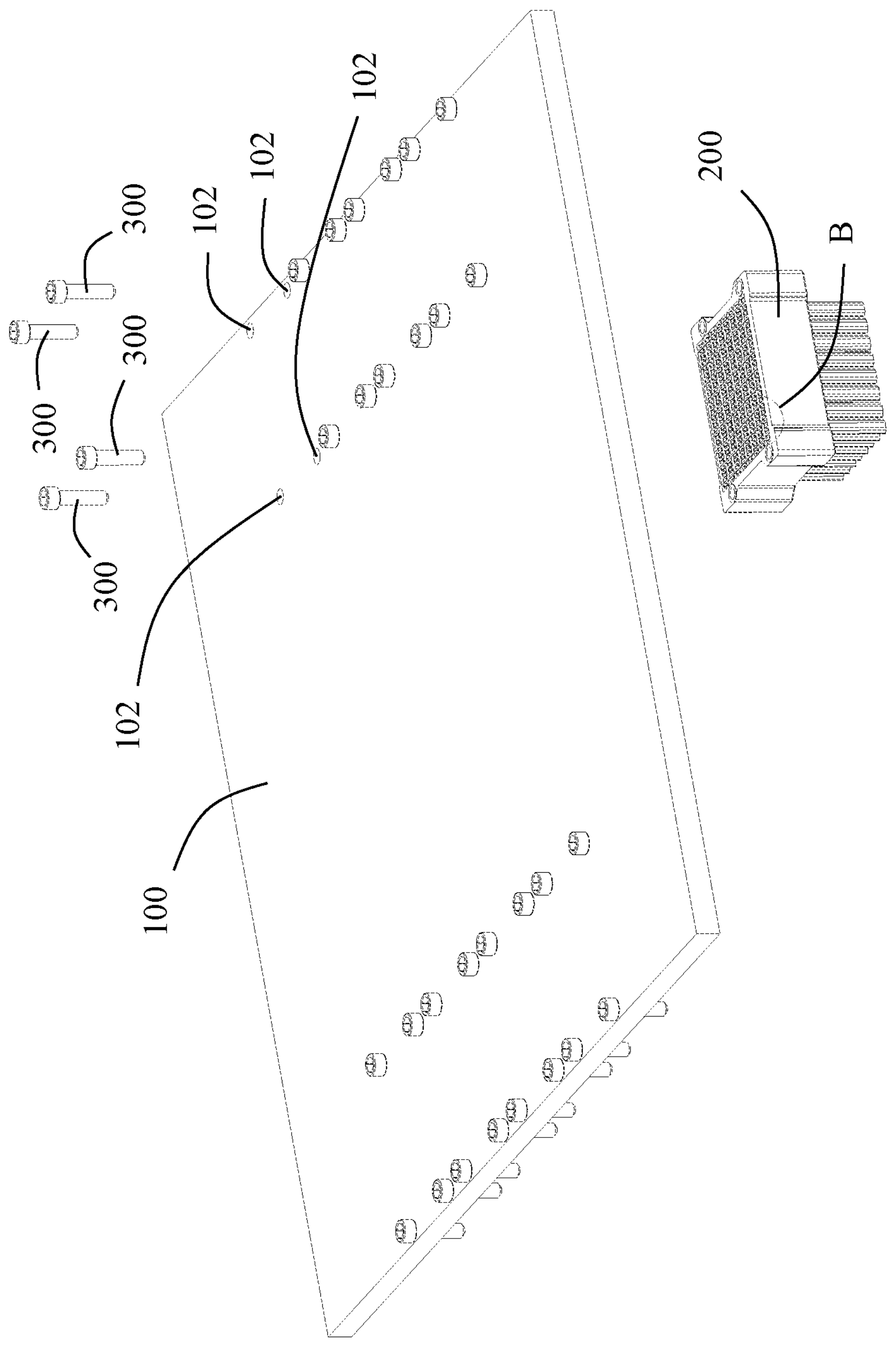
FIG. 3 is a partial perspective exploded view of another angle of FIG. 2.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 4, the present disclosure discloses an electrical connector assembly including a circuit board 100, an electrical connector 200 mounted on the circuit board 100, and a plurality of mounting members 300 for securing the electrical connector 200 and the circuit board 100 together.

Figure 4:
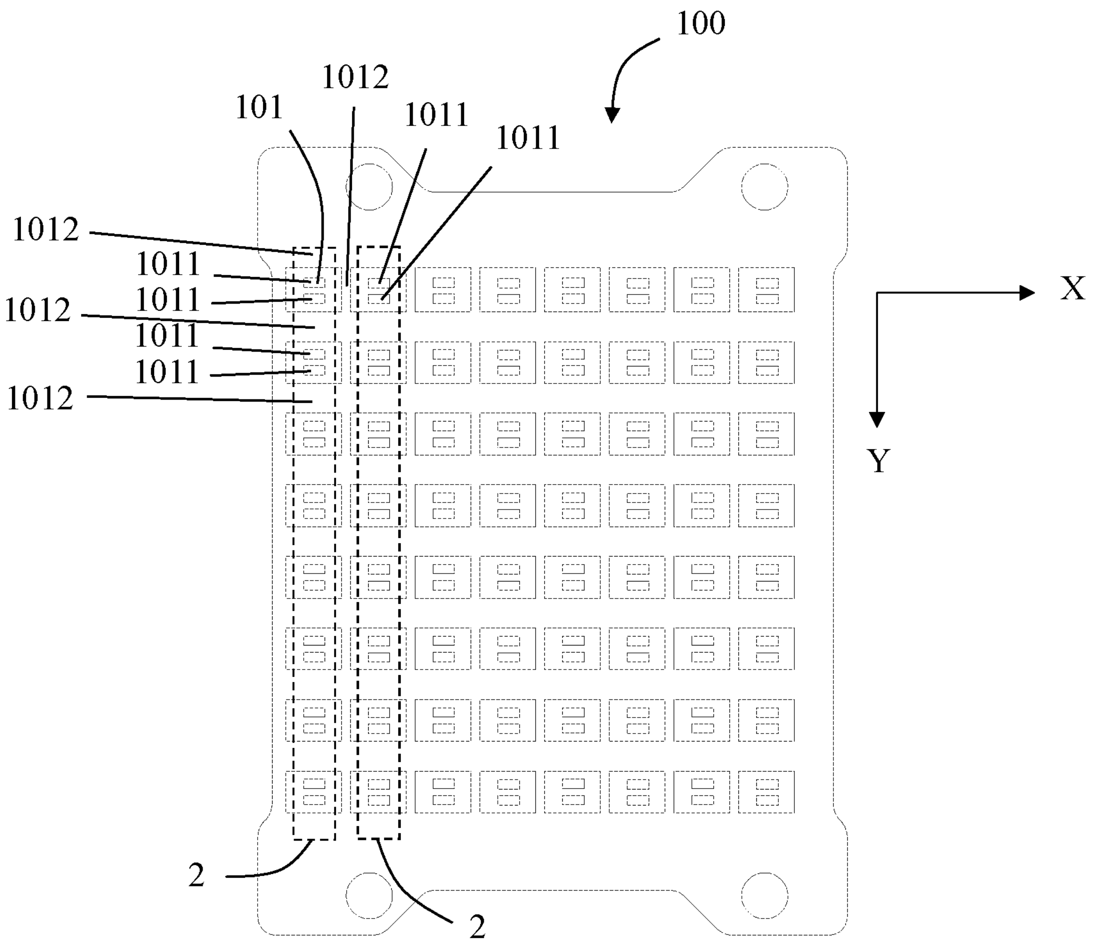
FIG. 4 is a top view of a portion of a circuit board in FIG. 2 corresponding to an electrical connector.
Figure 5:
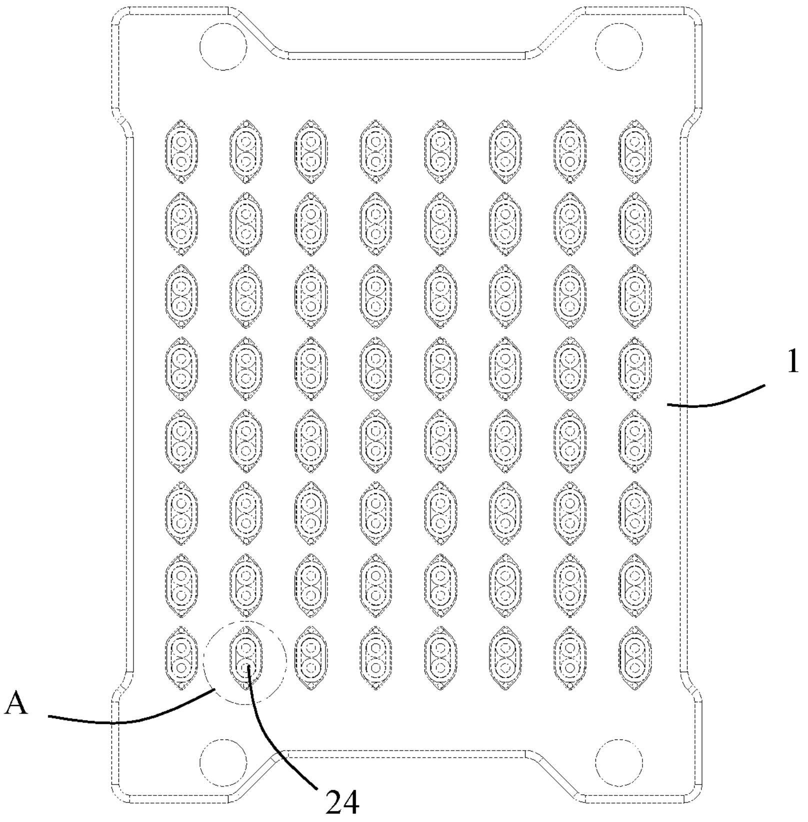
FIG. 5 is a top view of the electrical connector in FIG. 2.

Referring to FIG. 4, in the embodiment shown in the present disclosure, a portion of the circuit board 100 corresponding to the electrical connector 200 includes a plurality of conductive pads 101 and a plurality of mounting holes 102. The plurality of conductive pads 101 include a plurality of pairs of differential signal conductive pads 1011 and a plurality of frame-shaped grounding pads 1012. The plurality of pairs of differential signal conductive pads 1011 are generally arranged in a matrix. That is, the plurality of pairs of differential signal conductive pads 1011 are arranged at intervals along a transverse direction X and a longitudinal direction Y perpendicular to the transverse direction X. A periphery of each pair of differential signal conductive pads 1011 is surrounded by one frame-shaped grounding pad 1012. This design is beneficial to strengthen shielding and improve the quality of signal transmission. In the embodiment shown in the present disclosure, the frame-shaped grounding pads 1012 are connected as a whole, so that each pair of differential signal conductive pads 1011 can share an integral grounding piece, thereby increasing the ground shielding area and improving the ground shielding effect. Compared with the grounding pads provided independently, the present disclosure makes full use of the area of the circuit board 100, optimizes the layout, and improves the ground shielding effect. The present disclosure also omits a separate connection structure for connecting these independent grounding pads in series, thereby saving costs. In one embodiment of the present disclosure, the frame-shaped grounding pads 1012 are formed by a grounding layer which is formed on one surface of the circuit board 100 by vapor deposition, electroplating, or the like. It is understandable to those skilled in the art that the frame-shaped grounding pad 1012 surrounds the periphery of each pair of differential signal conductive pads 1011. However, the frame-shaped grounding pads 1012 are not in contact with each pair of differential signal conductive pads 1011 in order to avoid signal short circuit.

In the illustrated embodiment of the present disclosure, the mounting member 300 is a bolt. The bolts pass upwardly through the mounting holes 102 from a bottom of the circuit board 100. A portion of the bolt protruding upwardly beyond the circuit board 100 is matched with the electrical connector 200 to achieve fixing.

In the embodiment shown in the present disclosure, the electrical connector 200 includes a metal shell 1 and a plurality of terminal modules 2 fixed to the metal shell 1. In the illustrated embodiment of the present disclosure, the metal shell 1 includes four fastening holes 11 located at four corners to be matched with the mounting members 300. In an embodiment of the present disclosure, each fastening hole 11 is provided with an internal thread. The portion of the bolt protruding upwardly beyond the circuit board 100 is provided with an external thread to match with the internal thread. Of course, in other embodiments, the electrical connector 200 and the circuit board 100 may also be installed by other fixing elements and/or fixing methods, which will not be described in detail in the present disclosure. In the embodiment shown in the present disclosure, the metal shell 1 further includes a mounting surface 12 at a bottom end. The mounting surface 12 is adapted for being mounted on the circuit board 100.

In an embodiment of the present disclosure, the metal shell 1 is provided with a plurality of receiving slots (not shown). The plurality of terminal modules 2 are installed side by side in the receiving slots. Two adjacent terminal modules 2 abut against each other or are spaced apart from each other by a certain distance.

Referring to FIGS. 7, 8, 24 and 25, the metal shell 1 further includes a plurality of barrier portions 13 adjacent to the mounting surface 12. In the illustrated embodiment of the present disclosure, each barrier portion 13 includes a rectangular receiving space 130 extending through the mounting surface 12. In the embodiment shown in the present disclosure, each barrier portion 13 includes a first barrier 131, a second barrier 132 opposite to the first barrier 131, a third barrier 133 connecting one side of the first barrier 131 and one side of the second barrier 132, and a fourth barrier 134 connecting another side of the first barrier 131 and another side of the second barrier 132. In the embodiment shown in the present disclosure, the first barrier 131 and the second barrier 132 are arranged at intervals along the longitudinal direction Y and are parallel to each other. The third barrier 133 and the fourth barrier 134 are spaced apart along the transverse direction X and parallel to each other. In other words, the first barrier 131 and the second barrier 132 are parallel to the transverse direction X. The third barrier 133 and the fourth barrier 134 are parallel to the longitudinal direction Y.

In the embodiment shown in the present disclosure, the structures of the plurality of terminal modules 2 are the same. The terminal modules 2 are fixed to the metal shell 1 along a direction perpendicular to the circuit board 100. The following only takes one terminal module 2 as an example for detailed description.

Referring to FIGS. 5 to 18, the terminal module 2 includes a plurality of conductive terminals 21, an insulating block 22 fixing the plurality of conductive terminals 21, a ground shielding piece 23 at least partially received in the insulating block 22, and a plurality of cables 24 connected to the plurality of conductive terminals 21.

Figure 6:
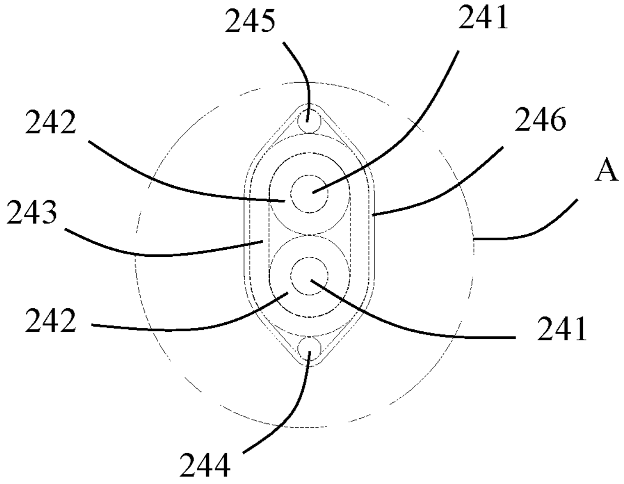
FIG. 6 is a partial enlarged view of a circled portion A in FIG. 5.
Figure 18:
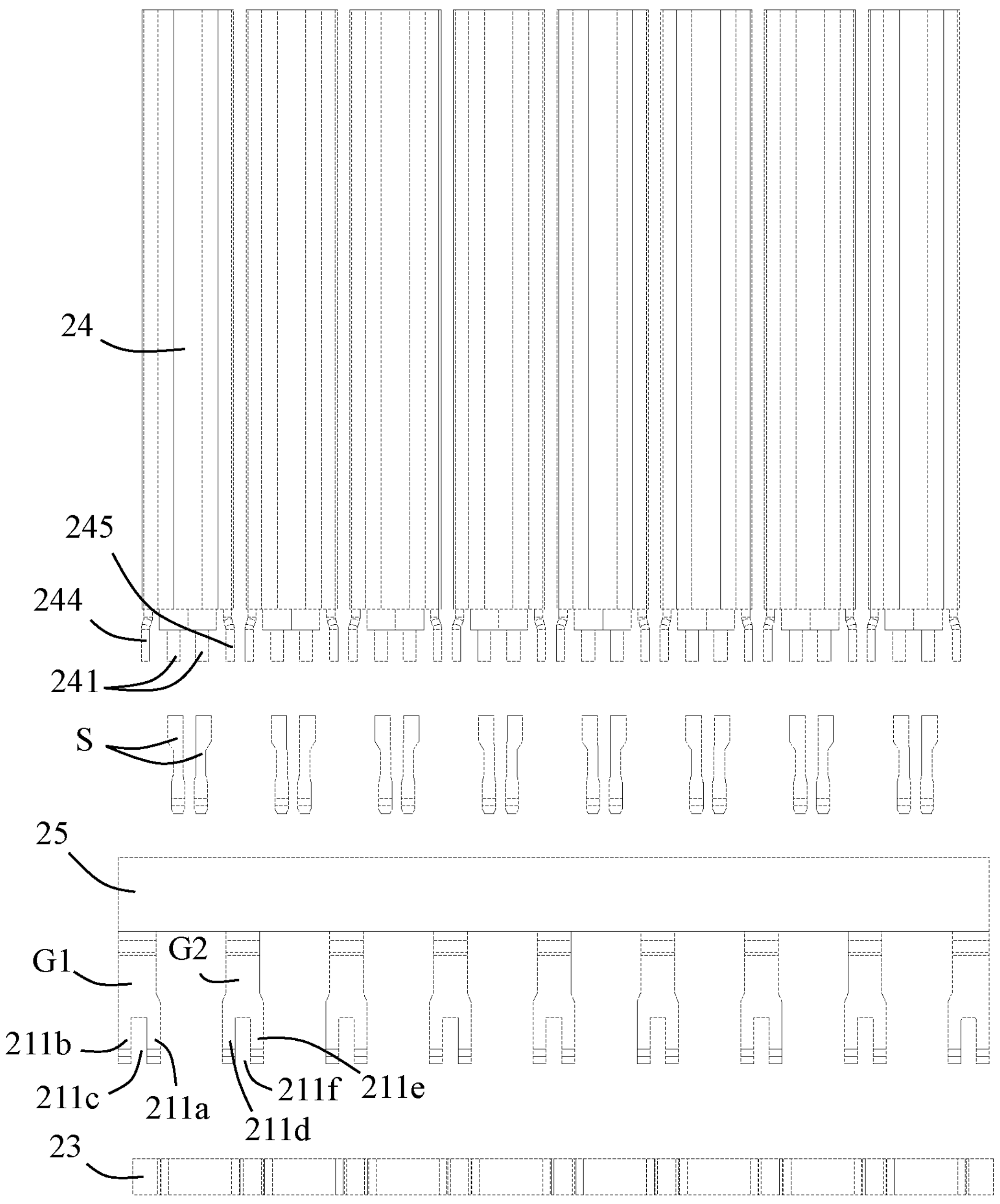
FIG. 18 is a front view of FIG. 16 at another angle.
Figure 19:
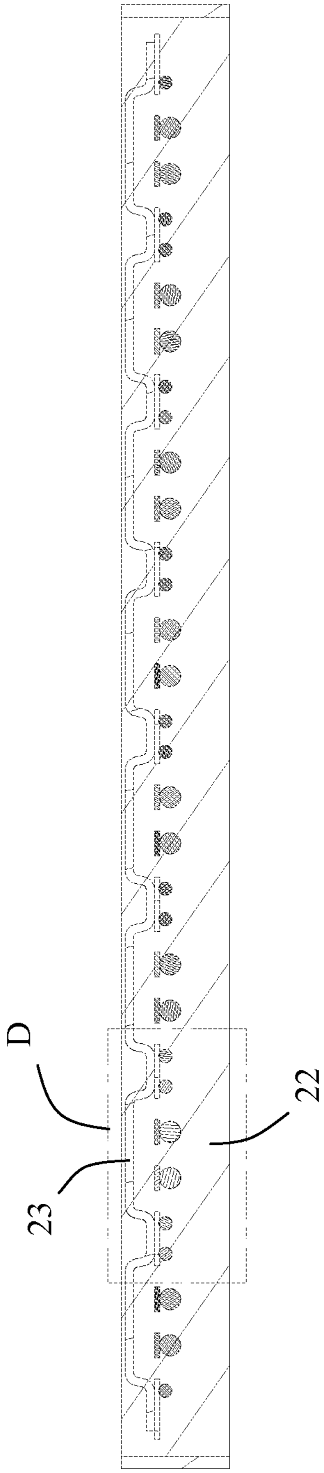
FIG. 19 is a schematic cross-sectional view taken along line C-C in FIG. 11.
Figure 20:
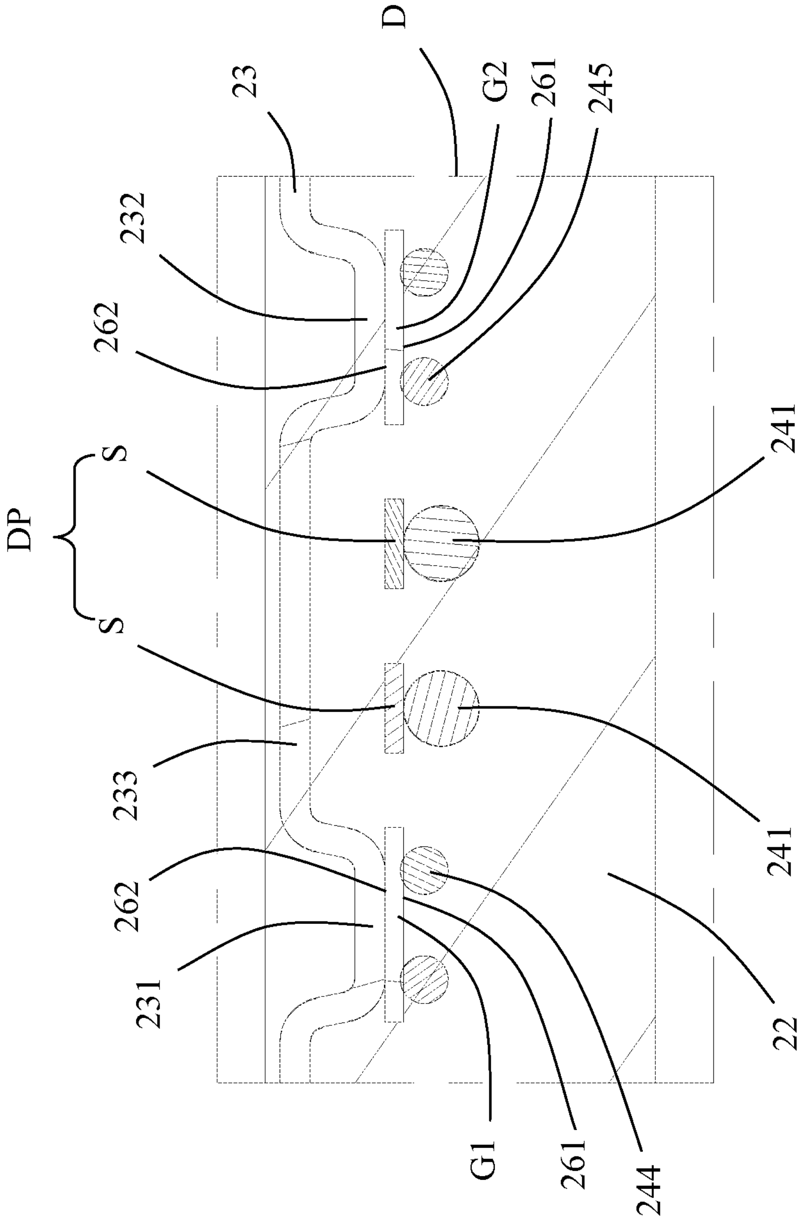
FIG. 20 is a partial enlarged view of a framed portion D in FIG. 19.
Figure 21:
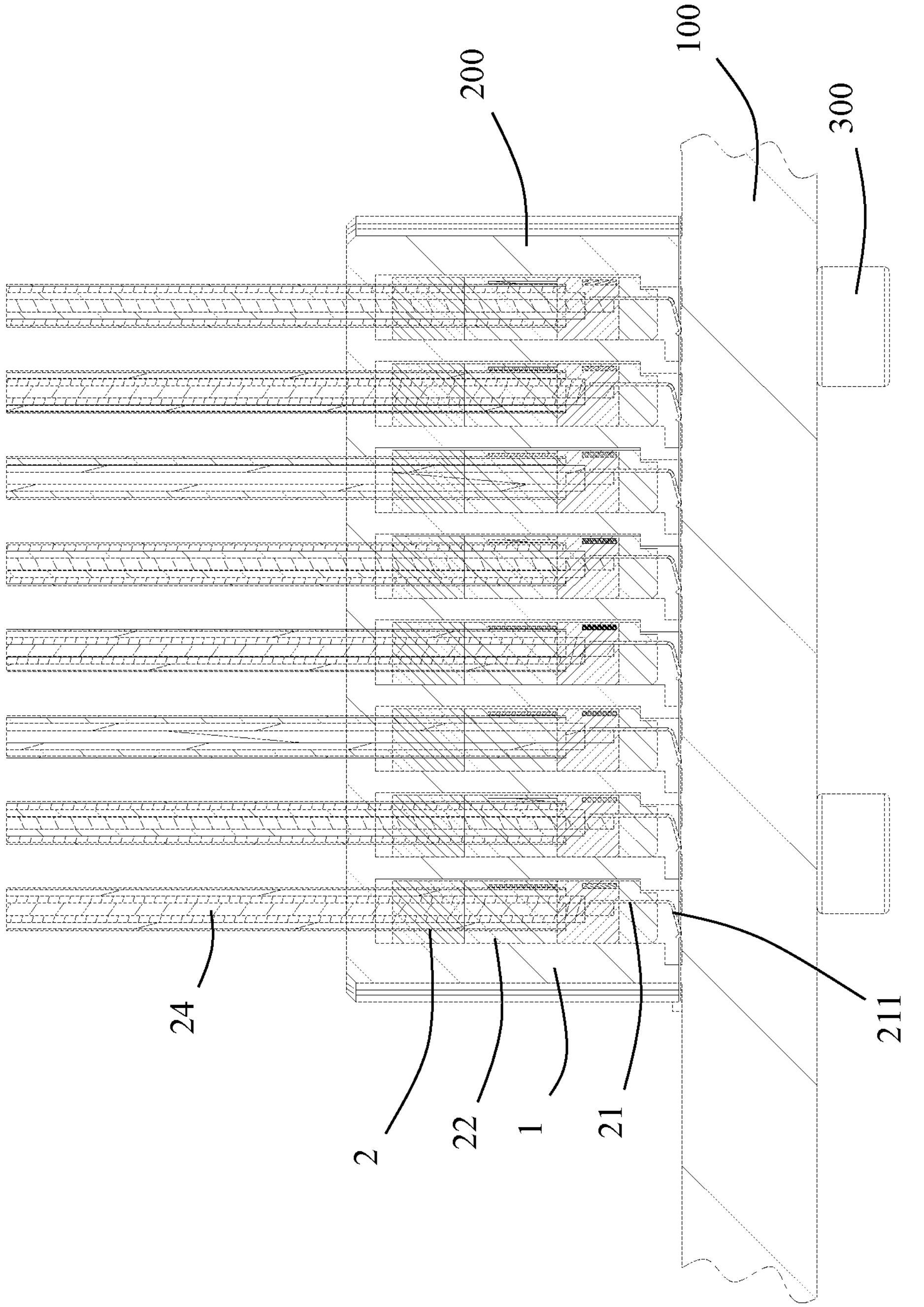
FIG. 21 is a schematic cross-sectional view taken along line E-E in FIG. 1.
Figure 22:
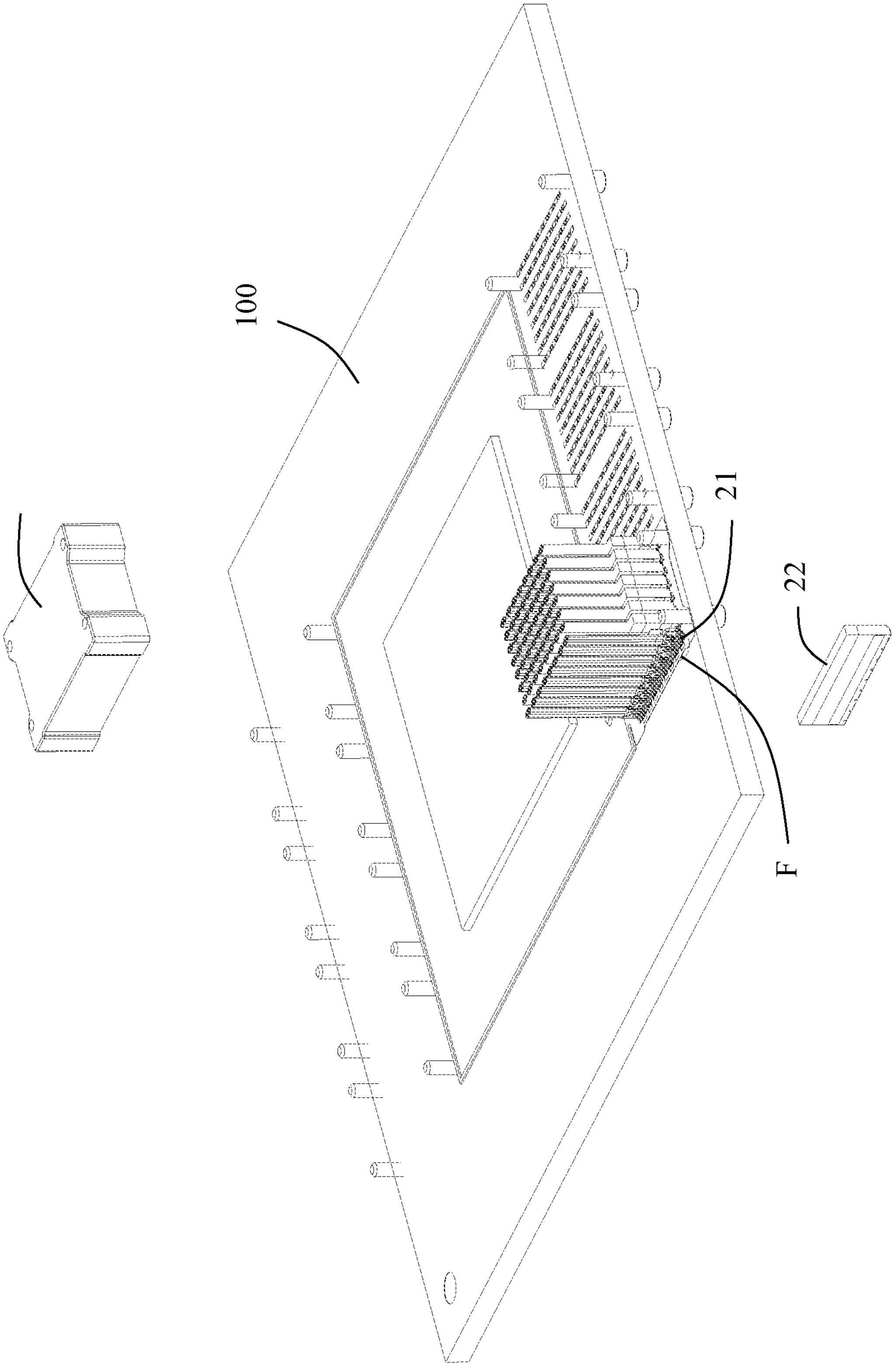
FIG. 22 is a partially exploded perspective view of the electrical connector assembly in accordance with an embodiment of the present disclosure, wherein a metal shell and an insulating block of a terminal module are separated.
Figure 23:
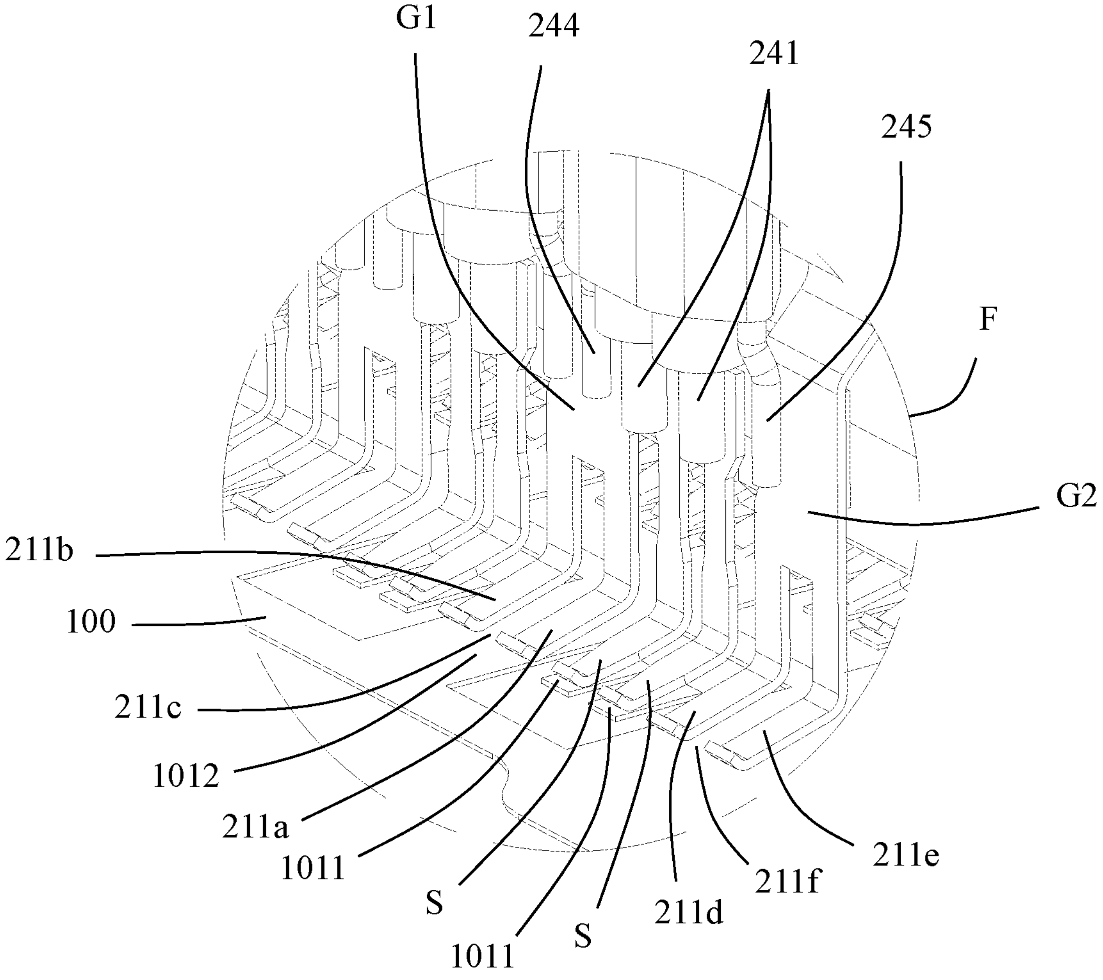
FIG. 23 is a partial enlarged view of a circled portion F in FIG. 22.
Figure 24:
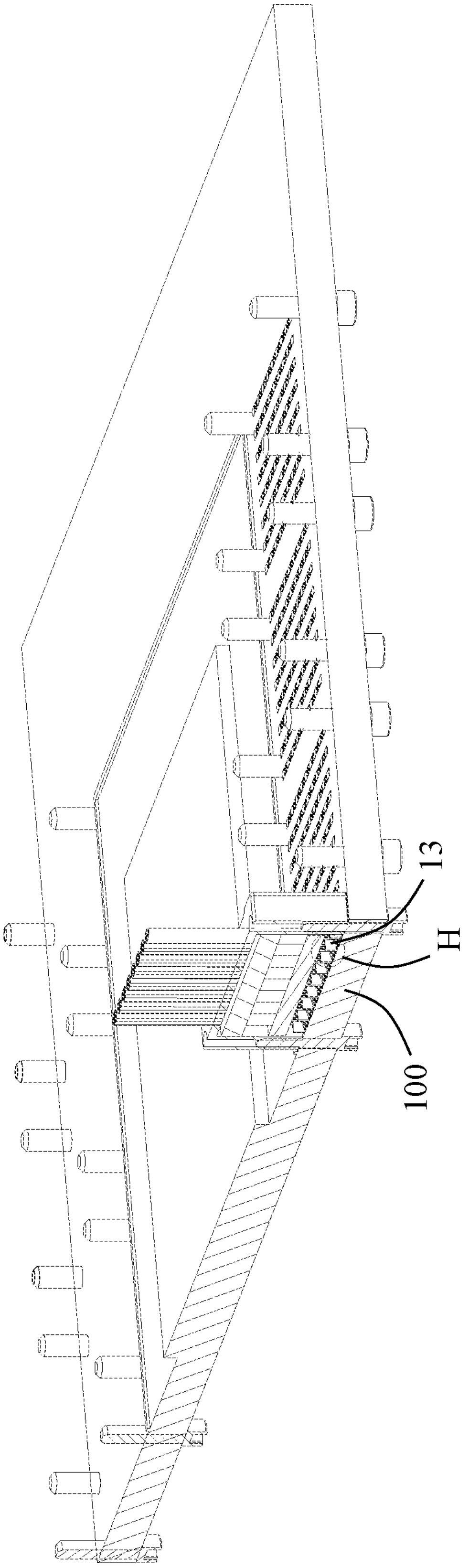
FIG. 24 is a schematic perspective cross-sectional view of the electrical connector assembly in accordance with an embodiment of the present disclosure.

Referring to FIGS. 6 and 18, each cable 24 includes a pair of signal cores 241, insulating layers 242 respectively wrapped on the pair of signal cores 241, a shielding layer 243 wrapped on the insulating layers 242, a first ground core 244 and a second ground core 245 located outside the shielding layer 243, and an insulating sheath 246 wrapped around the outermost side of the cable 24. In the embodiment shown in the present disclosure, the first ground core 244 and the second ground core 245 are both located outside (e.g., on opposite sides) of the pair of signal cores 241. In the embodiment shown in the present disclosure, the cables 24 connected to the conductive terminals 21 extend in a direction perpendicular to the circuit board 100. This arrangement is beneficial to reduce the mutual interference that may be caused when each terminal module 2 is assembled to the metal shell 1.

The plurality of conductive terminals 21 include a plurality of pairs of differential signal terminals DP (Differential Pair), a plurality of first ground terminals G1 and a plurality of second ground terminals G2. Opposite sides of each pair of differential signal terminals DP are associated with one of the first ground terminals G1 and one of the second ground terminals G2, respectively. Each conductive terminal 21 includes a mating elastic arm 211 extending beyond the mounting surface 12. The mating elastic arm 211 includes a contact portion 2111 for pressing against the conductive pad 101 of the circuit board 100.

Figure 17:
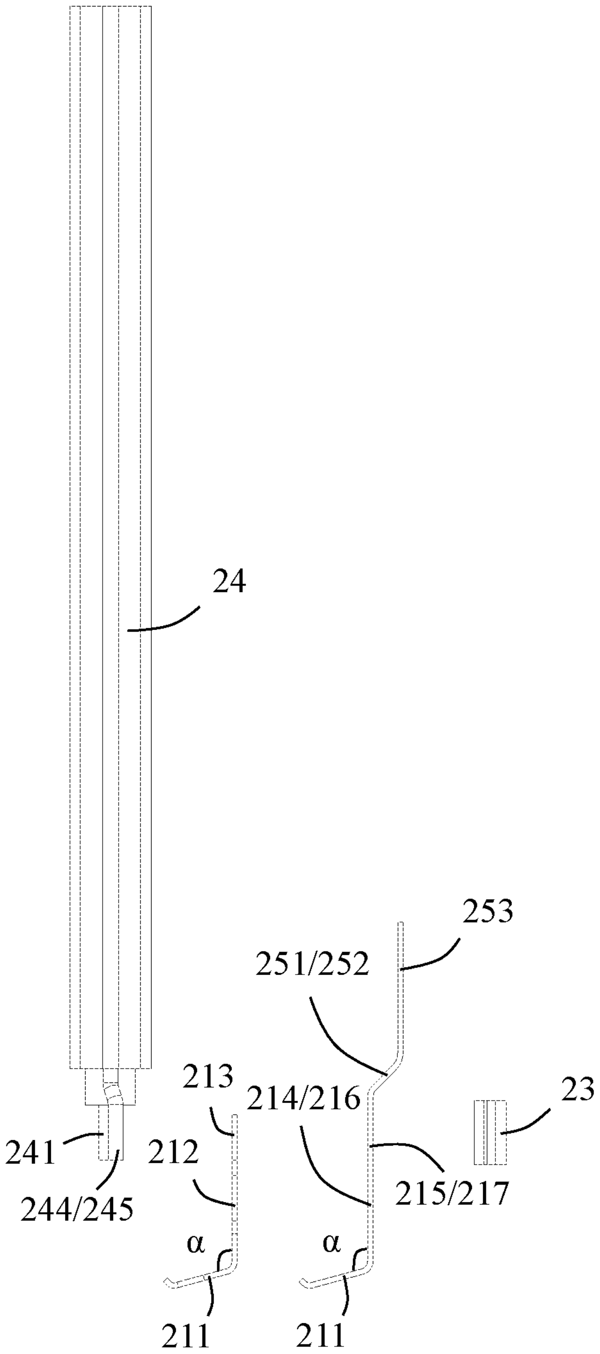
FIG. 17 is a side view of FIG. 16.

Specifically, in the embodiment shown in the present disclosure, each pair of differential signal terminals DP include two signal terminals S disposed adjacently. Each signal terminal S includes a vertical portion 212 connected to its mating elastic arm 211 and a tail portion 213 extending upwardly from the vertical portion 212. Referring to FIG. 17, in the embodiment shown in the present disclosure, the mating elastic arm 211 of the signal terminal S is formed by being bent relative to the vertical portion 212. A bending angle $\alpha$ is formed between the mating elastic arm 211 of the signal terminal S and the vertical portion 212, where $90° < \alpha < 180°$. This design can better balance the elasticity and rigidity of the mating elastic arm 211 of the signal terminal S. The tail portion 213 and the vertical portion 212 are located in a vertical plane. A surface area of the tail portion 213 is larger than a surface area of the vertical portion 212, thereby appropriately increasing the soldering area of the tail portion 213. As a result, it is beneficial to solder the tail portion 213 to the signal core 241.

In the illustrated embodiment of the present disclosure, the first ground terminal G1 includes a first vertical portion 214 connected to its mating elastic arm 211 and a first tail portion 215 extending upwardly from the first vertical portion 214. Referring to FIG. 17, in the embodiment shown in the present disclosure, the mating elastic arm 211 of the first ground terminal G1 is bent relative to the first vertical portion 214. A same bending angle $\alpha$ is formed between the mating elastic arm 211 of the first ground terminal G1 and the first vertical portion 214, where $90° < \alpha < 180°$. This design can better balance the elasticity and rigidity of the mating elastic arm 211 of the first ground terminal G1.

The second ground terminal G2 has the same structure as the first ground terminal G1. The second ground terminal G2 includes a second vertical portion 216 connected to its mating elastic arm 211 and a second tail portion 217 extending upwardly from the second vertical portion 216. Referring to FIG. 17, in the embodiment shown in the present disclosure, the mating elastic arm 211 of the second ground terminal G2 is bent relative to the second vertical portion 216. A same bending angle α is formed between the mating elastic arm 211 of the second ground terminal G2 and the second vertical portion 216, where 90°<α<180°. This design can better balance the elasticity and rigidity of the mating elastic arm 211 of the second ground terminal G2.

Figure 12:
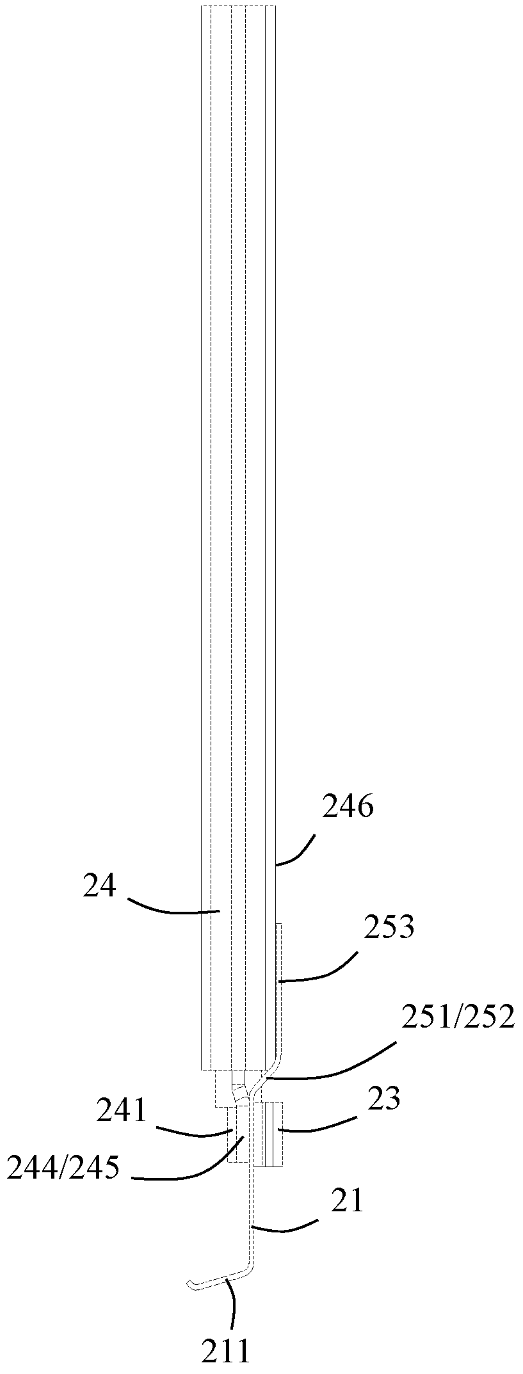
FIG. 12 is a side view of the terminal module after removing an insulating block in FIG. 11.
Figure 13:
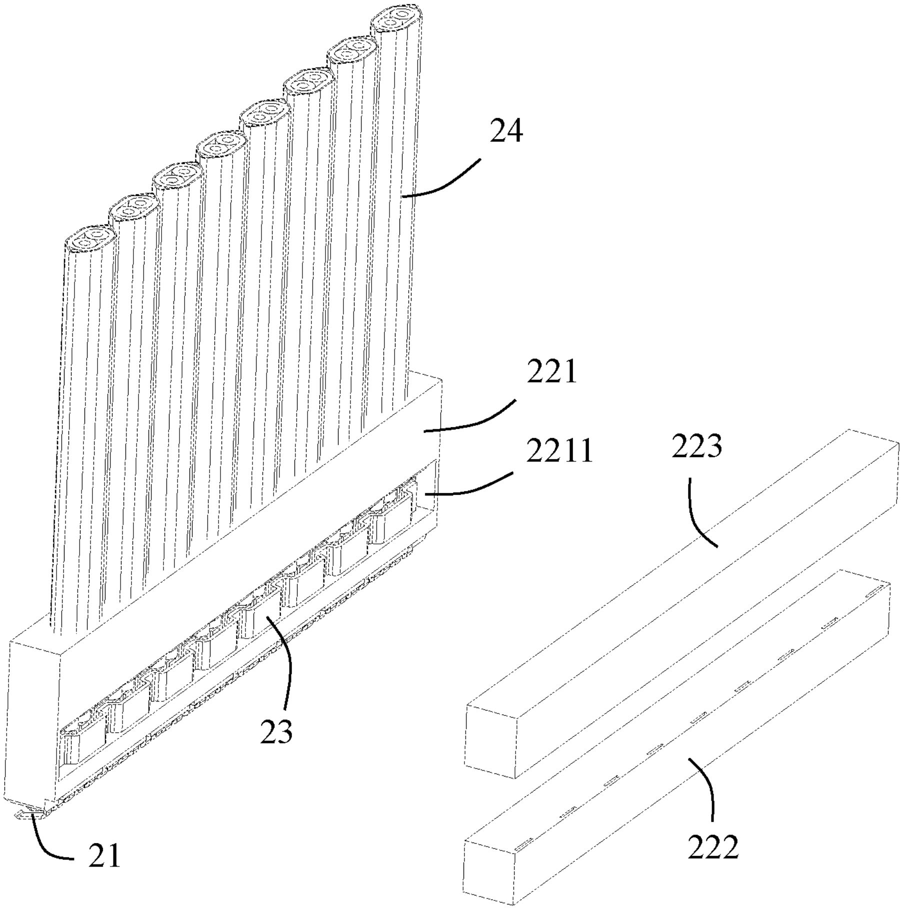
FIG. 13 is a partial perspective exploded view of the terminal module.
Figure 14:
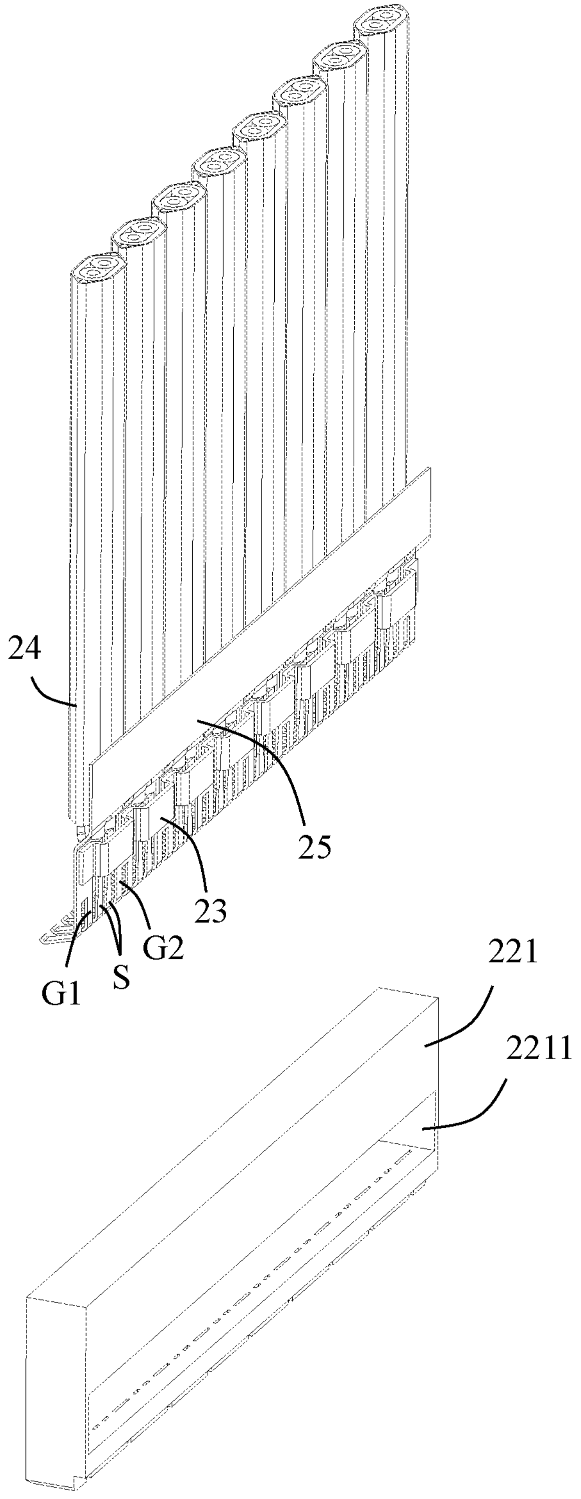
FIG. 14 is a further exploded perspective view of the terminal module after a second insulating block and a third insulating block in FIG. 13 are removed.

Referring to FIG. 12, as viewed from a side, the mating elastic arms 211 of the signal terminals S, the mating elastic arms 211 of the first ground terminals G1, and the mating elastic arms 211 of the second ground terminals G2 are completely overlapped.

Figure 7:
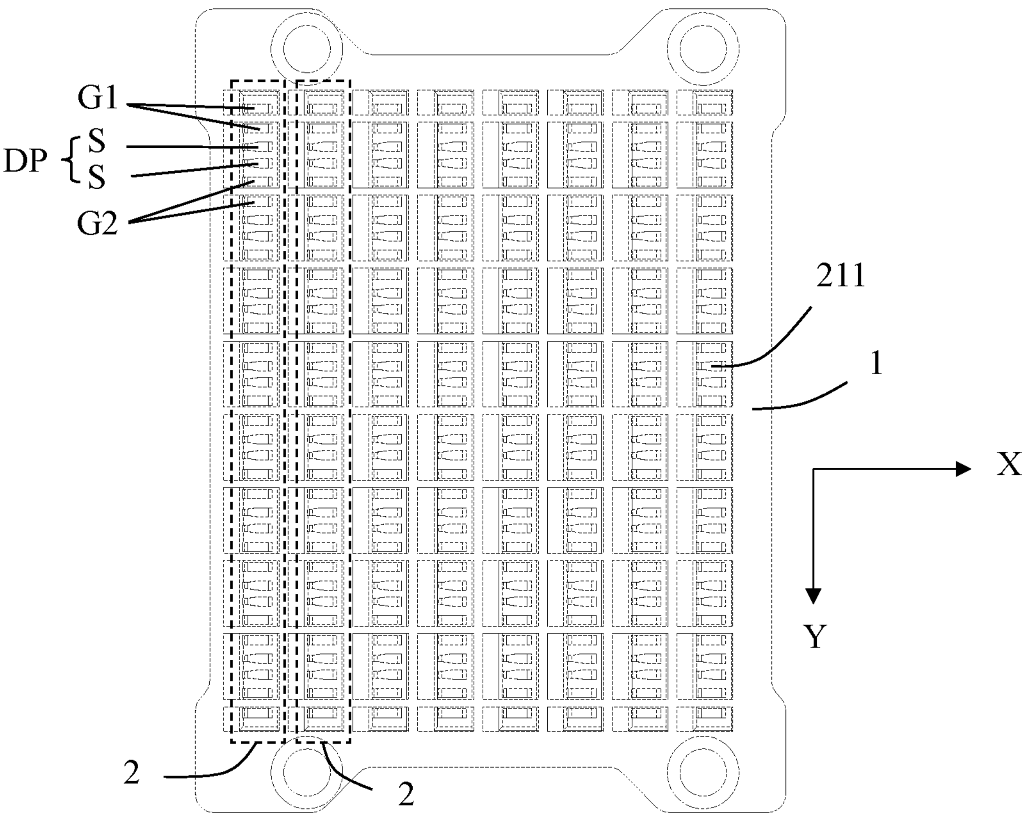
FIG. 7 is a bottom view of FIG. 5.
Figure 8:
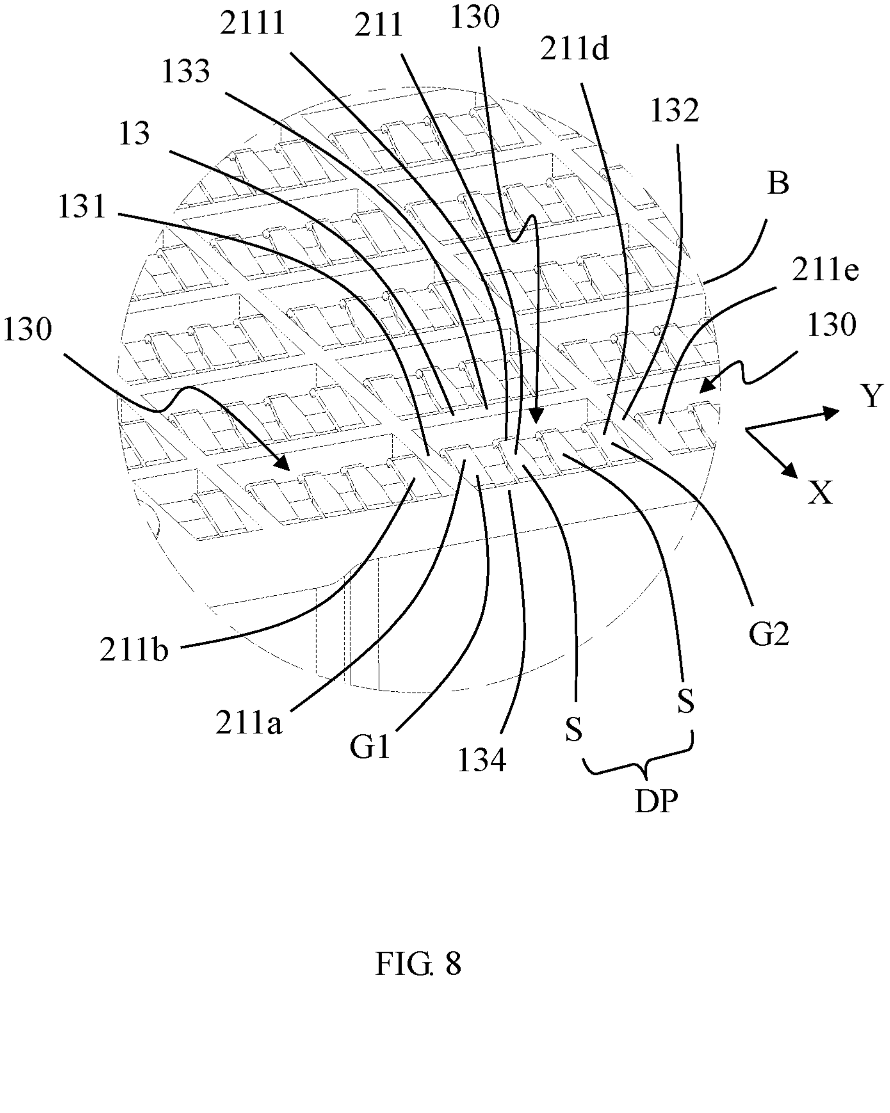
FIG. 8 is a partial enlarged view of a circled portion B in FIG. 3.
Figure 9:
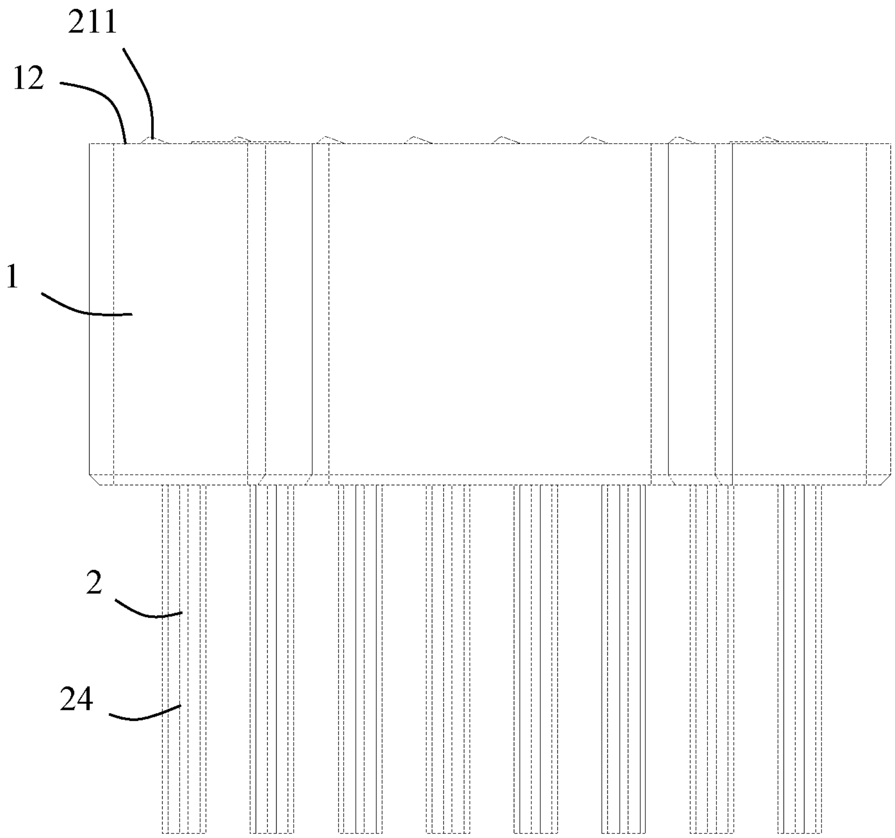
FIG. 9 is a side view of the electrical connector in FIG. 3.
Figure 10:
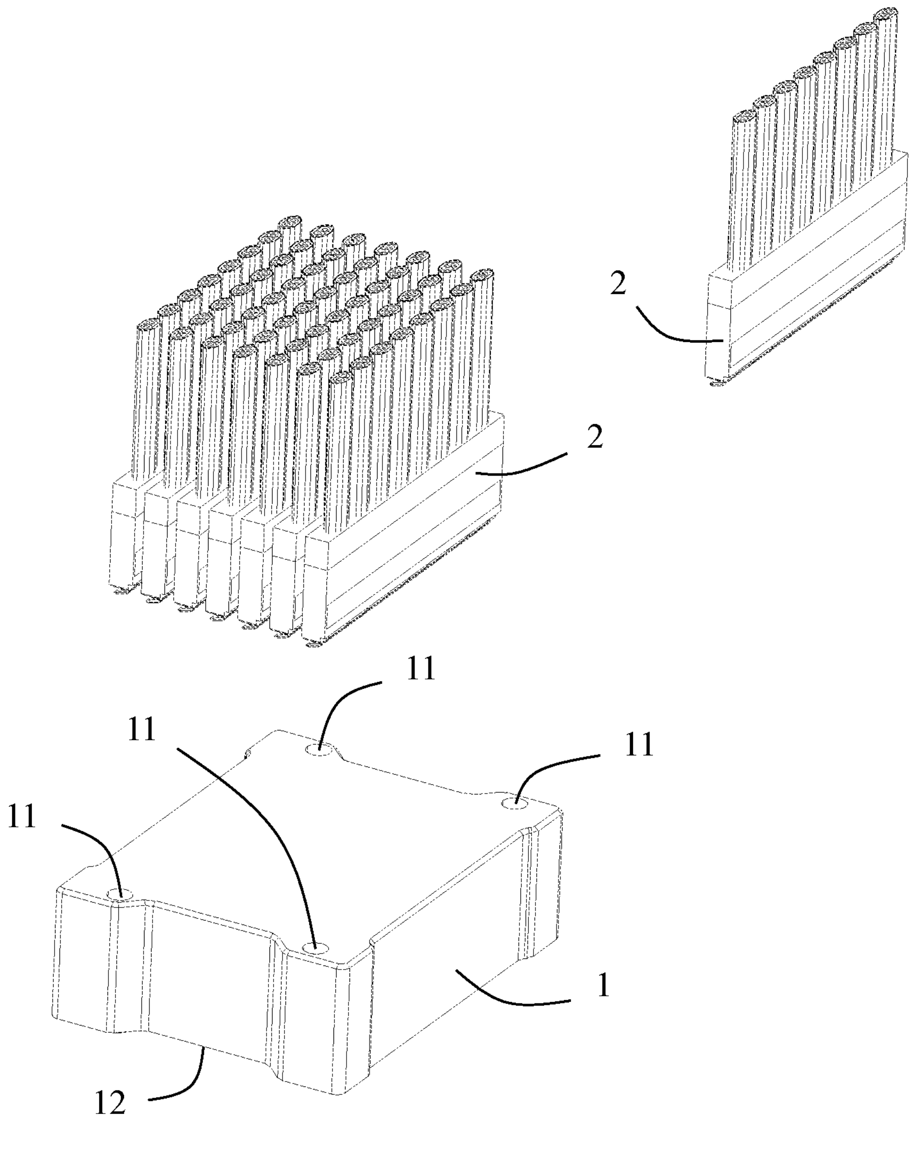
FIG. 10 is a partial perspective exploded view of the electrical connector in FIG. 3.
Figure 11:
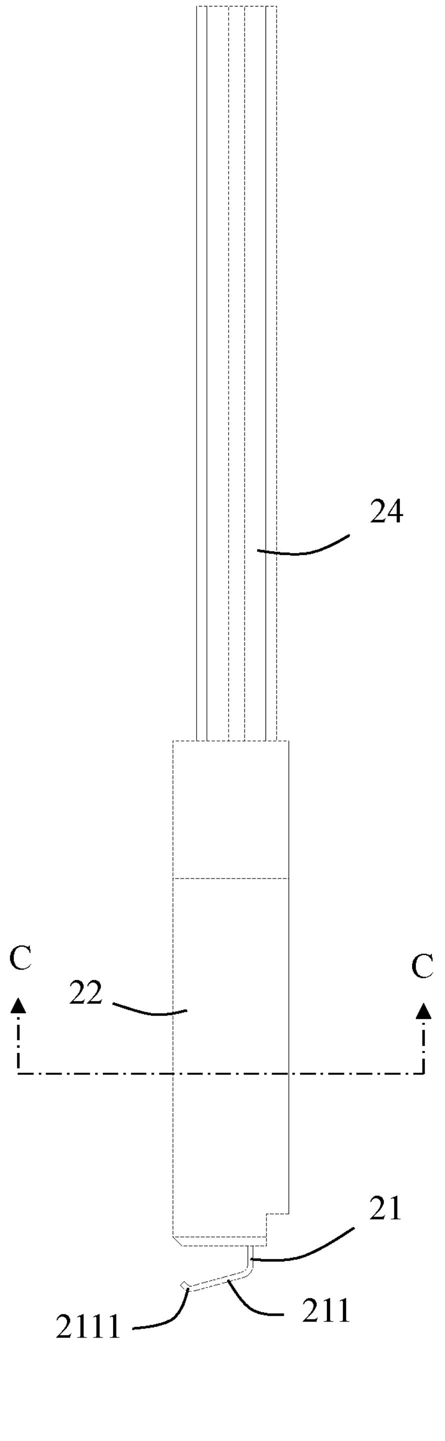
FIG. 11 is a side view of a terminal module.

Referring to FIGS. 7 and 8, the contact portions 2111 of the plurality of conductive terminals 21 in each of the terminal modules 2 are aligned and arranged in a row along the longitudinal direction Y. The contact portions 2111 of the conductive terminals 21 at corresponding positions in the terminal modules 2 are aligned and arranged in multiple parallel rows along the transverse direction X perpendicular to the longitudinal direction Y. In other words, in the embodiment shown in the present disclosure, the contact portions 2111 of the terminal modules 2 are arranged in a matrix.

Figure 15:
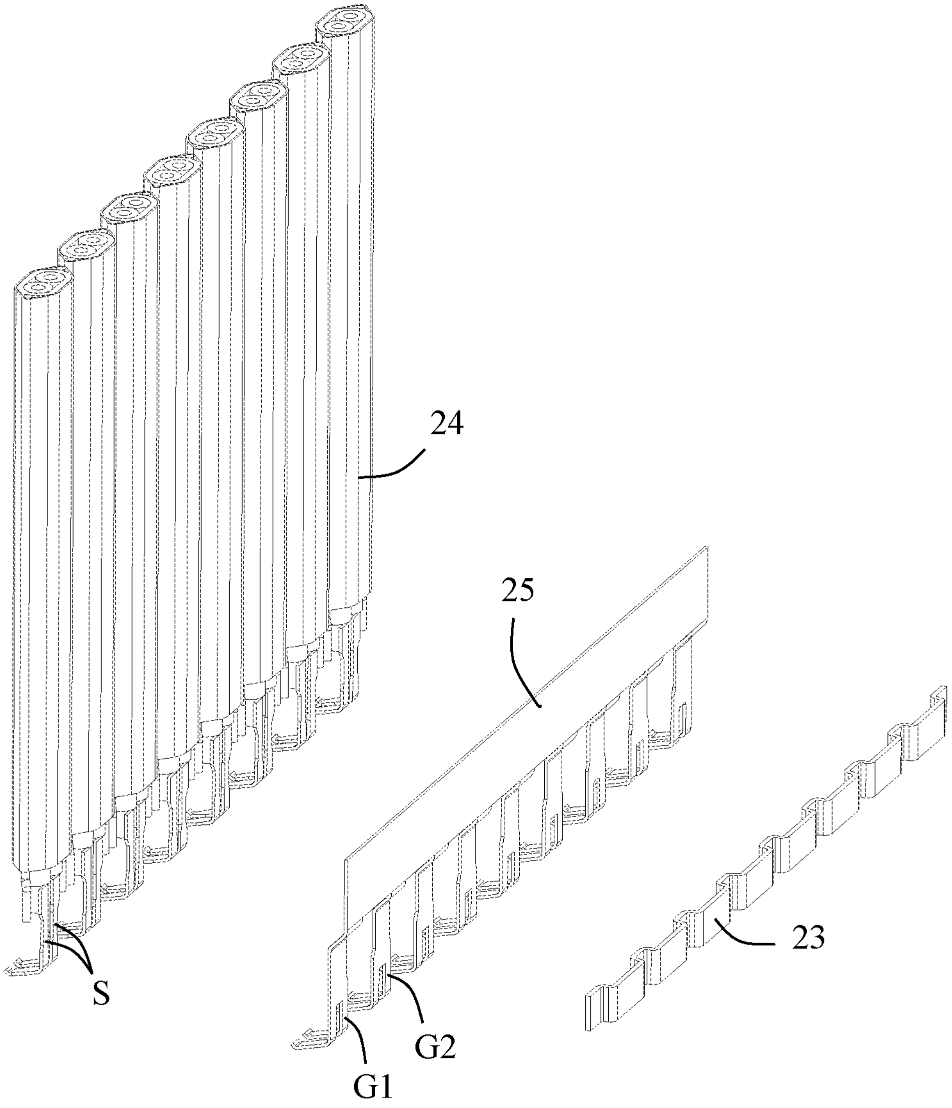
FIG. 15 is a further exploded perspective view of the terminal module after removing the first insulating block in FIG. 14.
Figure 16:
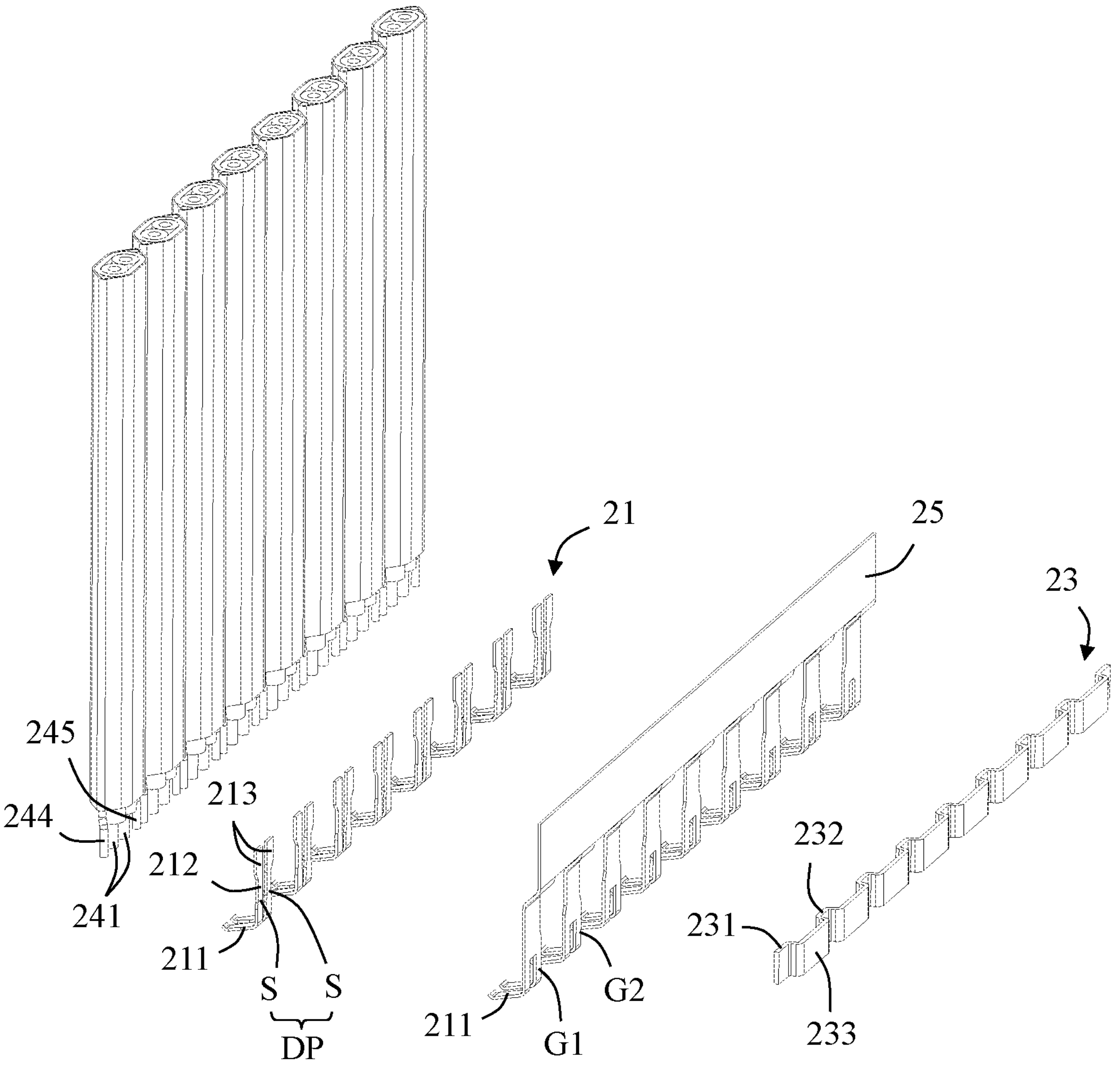
FIG. 16 is a further exploded perspective view of FIG. 15.

Referring to FIGS. 15, 16 and 18, each of the mating elastic arm 211 of the first ground terminal G1 and the mating elastic arm 211 of the second ground terminal G2 is bifurcated. A width of each of the mating elastic arm 211 of the first ground terminal G1 and the mating elastic arm 211 of the second ground terminal G2 is larger than a width of each mating elastic arm 211 of the signal terminal S. This design is beneficial to appropriately increase the area of the first ground terminal G1 and the second ground terminal G2, thereby improving the ground shielding effect.

Specifically, in the embodiment shown in the present disclosure, the mating elastic arm 211 of the first ground terminal G1 includes a first branch arm 211*a*, a second branch arm 211*b*, and a first slit 211*c* separating the first branch arm 211*a* from the second branch arm 211*b*. The first branch arm 211*a* and the second branch arm 211*b* are arranged side by side and in parallel. The first slit 211*c* separates the first branch arm 211*a* from the second branch arm 211*b*. In the embodiment shown in the present disclosure, the structures of the first branch arm 211*a* and the second branch arm 211*b* are the same.

Similarly, in the embodiment shown in the present disclosure, the mating elastic arm 211 of the second ground terminal G2 includes a third branch arm 211*d*, a fourth branch arm 211*e*, and a second slit 211*f* separating the third branch arm 211*d* from the fourth branch arm 211*d*. The third branch arm 211*d* and the fourth branch arm 211*e* are arranged side by side and in parallel. The second slit 211*f* separates the third branch arm 211*d* from the fourth branch arm 211*e*. In the embodiment shown in the present disclosure, the structures of the third branch arm 211*d* and the fourth branch arm 211*e* are the same.

Referring to FIG. 4, the plurality of pairs of differential signal conductive pads 1011 arranged along the longitudinal direction Y and the grounding pads 1012 located on opposite sides of each pair of differential signal conductive pads 1011 along the longitudinal direction Y are adapted for mating with a single terminal module 2 (referring to a dotted box in FIG. 4). Referring to FIG. 7, the singe terminal module 2 of the electrical connector 200 is shown as the dotted box. The mating elastic arms 211 of the first ground terminal G1 and the second ground terminal G2 press against a corresponding grounding pads 1012. The mating elastic arms 211 of each pair of differential signal terminals DP press against a corresponding pair of differential signal conductive pads 1011. Along the longitudinal direction Y, the width of the grounding pad 1012 between two adjacent pairs of differential signal conductive pads 1011 is greater than the distance between the two differential signal conductive pads 1011 in each pair of differential signal conductive pads 1011. In this way, the wider grounding pad 1012 can provide a sufficient distance to contact the bifurcated mating elastic arm 211 of the first ground terminal G1 and the bifurcated mating elastic arm 211 of the second ground terminal G2.

Referring to FIG. 8 and FIGS. 22 to 25, after the plurality of the terminal modules 2 are fixed to the metal shell 1, each first barrier 131 is vertically inserted into the first slit 211 *c*, and each second barrier 132 is vertically inserted into the second slit 211*f*. In each receiving space 130, it resides two mating elastic arms 211 of a pair of differential signal terminals DP, one branch arm of one first ground terminal G1 (e.g., the first branch arm 211*a* or the second branch arm 211*b*), and one branch arm of one second ground terminal G2 (e.g., the third branch arm 211*d* or the fourth branch arm 211*e*). In each receiving space 130, the plurality of conductive terminals 21 are arranged in a G-S-S-G manner, which is beneficial to improve the shielding effect. In addition, by providing the first barrier 131, the second barrier 132, the third barrier 133 and the fourth barrier 134 surrounding the receiving space 130, a group of differential signal terminals DP in the receiving space 130 can be better shielded, and interference between the group of differential signal terminals DP in the receiving space 130 and a group of differential signal terminals DP in another receiving spaces 130 can be reduced. In the illustrated embodiment of the present disclosure, by providing the plurality of barrier portions 13, two adjacent receiving spaces 130 in the transverse direction X or the longitudinal direction Y are separated, thereby reducing the interference between the pairs of differential signal terminals DP.

Figure 25:
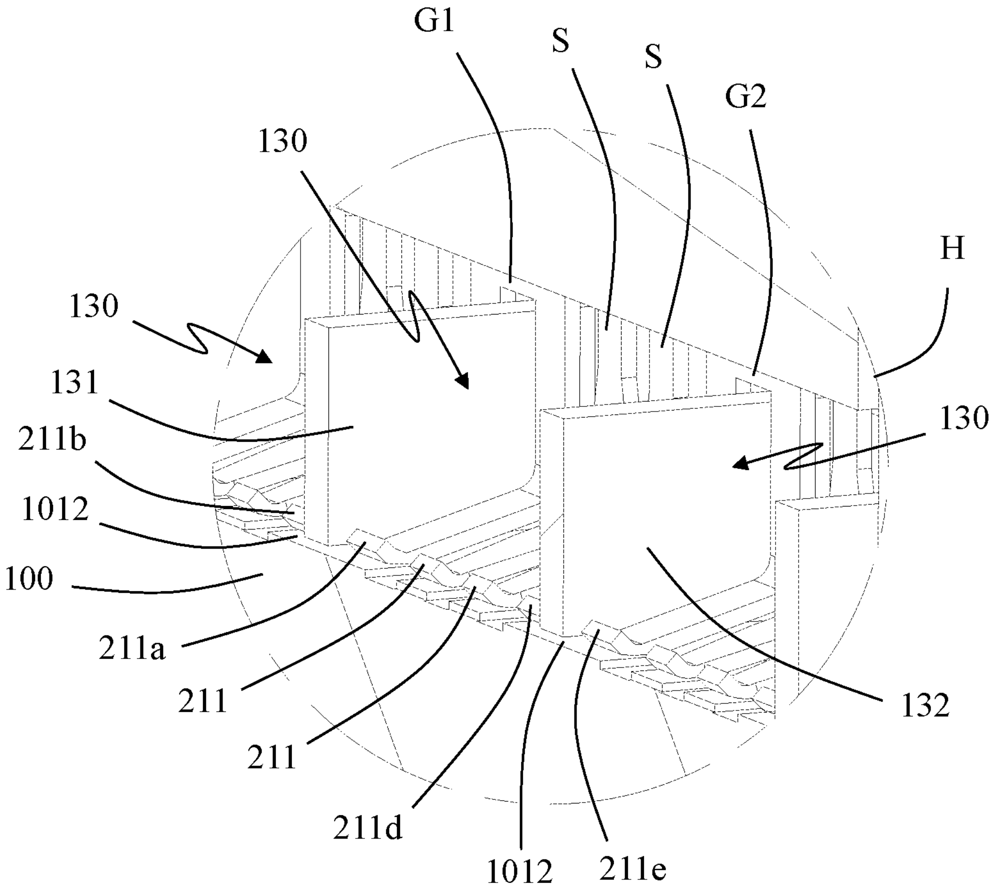
FIG. 25 is a partial enlarged view of a circled portion H in FIG. 24.

In addition, since the mating elastic arm 211 of the first ground terminal G1 and the mating elastic arm 211 of the second ground terminal G2 are bifurcated, two adjacent receiving spaces 130 along the longitudinal direction Y share the same first ground terminal G1 and share the same second ground terminal G2. Specifically, referring to FIGS. 8 and 25, the first branch arm 211*a* of a first ground terminal G1 and the third branch arm 211*d* of a second ground terminal G2 are located in a same receiving space 130 (e.g., an intermediate receiving space in FIG. 8). The second branch arm 211*b* of the first ground terminal G1 extends into another receiving space 130 (e.g., a left-side receiving space 130 in FIG. 8) adjacent to the receiving space 130. The fourth branch arm 211*e* of the second ground terminal G2 extends into another receiving space 130 (e.g., a right-side receiving space 130 in FIG. 8) adjacent to the receiving space 130. Referring to FIG. 25, at least one of the first barrier 131, the second barrier 132, the third barrier 133 and the fourth barrier 134 is in contact with the grounding pad 1012, in order to improve the ground shielding effect and improve the signal transmission quality. Preferably, in the embodiment shown in the present disclosure, the first barrier 131, the second barrier 132, the third barrier 133 and the fourth barrier 134 are all in contact with the frame-shaped grounding pad 1012 so as to form a surrounding shielding space. As a result, the ground shielding effect and the signal transmission quality are further improved.

Referring to FIGS. 15 to 18, the terminal module 2 further includes a connecting piece 25 which connects the plurality of first ground terminals G1 and the plurality of second ground terminals G2 as a whole. In the embodiment shown in the present disclosure, the plurality of first ground terminals G1, the plurality of second ground terminals G2 and the connecting piece 25 are punched and bent from a piece of metal plate. The connecting piece 25 and the ground shielding piece 23 are located on a same side of the terminal module 2, and the connecting piece 25 is located opposite to a cable side.

Specifically, in the embodiment shown in the present disclosure, the connecting piece 25 includes a first deflection portion 251, a second deflection portion 252 connected to the second ground terminal G2, and an extension portion 253 connecting the first deflection portion 251 and the second deflection portion 252 together. Referring to FIG. 17, the extension portion 253 is located in a vertical plane. The first deflection portion 251 and the second deflection portion 252 are arranged obliquely. In an embodiment of the present disclosure, the extension portion 253 is abutted against the insulating sheath 246 of the cable 24 so as to improve the compactness of the structure.

The ground shielding piece 23 connects the plurality of first ground terminals G1 and the second ground terminals G2 in series to improve the ground shielding effect. Referring to FIGS. 12 to 21, in the embodiment shown in the present disclosure, the ground shielding piece 23 is roughly in a wave shape with alternating concavities and convexities. The ground shielding piece 23 includes a plurality of first abutting portions 231 abutting against the first ground terminals G1, a plurality of second abutting portions 232 abutting against the second ground terminals G2, and a plurality of protruding portions 233 each connected between a corresponding first abutting portion 231 and a corresponding second abutting portion 232. The protruding portion 233 deviates from a corresponding pair of differential signal terminals DP to the outside, so as to avoid short circuit caused by contacting the pair of differential signal terminals DP.

In the embodiment shown in the present disclosure, the pair of signal cores 241 of the cable 24 is electrically connected (e.g., soldered) to a corresponding pair of the differential signal terminals DP. The first ground core 244 is electrically connected to a corresponding first ground terminal G1. The second ground core 245 is electrically connected to a corresponding second ground terminal G2. Referring to FIGS. 12 to 20, each of the first ground terminal G1 and the second ground terminal G2 include a first side 261 and a second side 262 opposite to the first side 261. The first ground core 244 and the second ground core 245 are soldered and fixed to the first side 261 of the first ground terminal G1 and the first side 261 of the second ground terminal G2, respectively. The ground shielding piece 23 is in contact with the second side 262 of the first ground terminal G1 and the second side 262 of the second ground terminal G2.

In the embodiment shown in the present disclosure, the plurality of conductive terminals 21 are insert-molded with the insulating block 22. Of course, in other embodiments, the plurality of conductive terminals 21 may also be fixed to the insulating block 22 through assembling or the like.

The insulating block 22 includes a first insulating block 221, a second insulating block 222 and a third insulating block 223. In the embodiment shown in the present disclosure, a height of the first insulating block 221 is greater than either a height of the second insulating block 222 or a height of the third insulating block 223. Specifically, the first insulating block 221 includes a slot 2211. Portions of the plurality of conductive terminals 21 adapted to connect with the plurality of cables 24 are exposed in the slot 2211 so as to facilitate soldering. In addition, the ground shielding piece 23 is received in the slot 2211. After the ground shielding piece 23 is received in the slot 2211, the second insulating block 222 is remolded on the first insulating block 221 and fills the slot 2211. The first deflection portion 251 and the second deflection portion 252 are fixed in the second insulating block 222. The extension portion 253 is fixed in the first insulating block 221. In addition, in order to strengthen the bonding strength with the cables 24, the third insulating block 223 is molded on the cables 24. After molding, the first insulating block 221, the second insulating block 222 and the third insulating block 223 form a whole.

Compared with the prior art, the present disclosure improves the shielding performance of the electrical connector 200 by providing the ground shielding piece 23 connecting the plurality of first ground terminals G1 and the second ground terminals G2 in series. In addition, by providing the mating elastic arm 211, and by having the contact portion 2111 of the mating elastic arm 211 be pressed against the conductive sheet 101 of the circuit board 100 (referring to FIG. 21), the convenience of mounting the electrical connector 200 on the circuit board 100 is improved. As a result, it is convenient for subsequent maintenance and even replacement of the electrical connector 200, without the need to damage the electrical connector 200.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector for being mounted on a circuit board, the electrical connector comprising:
- a metal shell comprising a mounting surface for mating with the circuit board; and
- a terminal module fixed to the metal shell, the terminal module comprising a plurality of conductive terminals, an insulating block fixing the plurality of conductive terminals, a ground shielding piece at least partially received in the insulating block, and a plurality of cables connected to the conductive terminals;
- wherein the plurality of conductive terminals comprise a plurality of pairs of differential signal terminals, a plurality of first ground terminals and a plurality of second ground terminals, opposite sides of each pair of differential signal terminals are associated with one of the first ground terminals and one of the second ground terminals, respectively; the ground shielding piece connects the plurality of first ground terminals and the plurality of second ground terminals in series; and
- wherein each conductive terminal comprises a mating elastic arm protruding beyond the mounting surface, and the mating elastic arm comprises a contact portion for pressing against a corresponding conductive pad of the circuit board.

2. The electrical connector according to claim 1, wherein each of the cables comprises a pair of signal cores, a first ground core located outside the pair of signal cores, and a second ground core located outside the pair of signal cores;

the pair of signal cores are electrically connected to a corresponding pair of the differential signal terminals, the first ground core is electrically connected to a corresponding first ground terminal, and the second ground core is electrically connected to a corresponding second ground terminal.

3. The electrical connector according to claim 2, wherein the terminal module further comprises a connecting piece connecting the plurality of first ground terminals and the plurality of second ground terminals into a whole; and wherein the connecting piece and the ground shielding piece are located on a same side of the terminal module.

4. The electrical connector according to claim 3, wherein the connecting piece comprises a first deflection portion, a second deflection portion connected to the second ground terminal, and an extension portion connecting the first deflection portion and the second deflection portion; the insulating block comprises a first insulating block defining a slot; portions of the plurality of conductive terminals adapted to connect with the plurality of cables are exposed in the slot; the ground shielding piece is received in the slot; the insulating block further comprises a second insulating block injection-molded in the slot, the first deflection portion and the second deflection portion are fixed in the second insulating block, and the extension portion is fixed in the first insulating block.

5. The electrical connector according to claim 2, wherein each of the first ground terminal and the second ground terminal comprises a first side and a second side opposite to the first side; the first ground core and the second ground core are soldered to the first side of the first ground terminal and the first side of the second ground terminal, respectively; the ground shielding piece is in contact with the second side of the first ground terminal and the second side of the second ground terminal.

6. The electrical connector according to claim 1, wherein each of the mating elastic arm of the first ground terminal and the mating elastic arm of the second ground terminal is bifurcated.

7. The electrical connector according to claim 1, wherein a plurality of the terminal modules are provided and have a same structure; the terminal modules are assembled to the metal shell along a direction perpendicular to the circuit board; the plurality of cables connected to the conductive terminals extend in a direction perpendicular to the circuit board.

8. The electrical connector according to claim 7, wherein the contact portions of the plurality of conductive terminals in each of the terminal modules are aligned and disposed in a row along a longitudinal direction; and wherein the contact portions of the conductive terminals at corresponding positions in the terminal modules are aligned and disposed in a plurality of rows parallel to each other along a transverse direction perpendicular to the longitudinal direction.

9. The electrical connector according to claim 1, wherein the metal shell comprises a plurality of barrier portions, each barrier portion defines a receiving space extending through the mounting surface, and one of the plurality of pairs of differential signal terminals, one of the first ground terminals and one of the second ground terminals are located in each receiving space.

10. The electrical connector according to claim 9, wherein each barrier portion comprises a first barrier, a second barrier opposite to the first barrier, a third barrier connecting one side of the first barrier and one side of the second barrier, and a fourth barrier connecting another side of the first barrier and another side of the second barrier;

wherein the mating elastic arm of the first ground terminal comprises a first branch arm, a second branch arm, and a first slit separating the first branch arm from the second branch arm;

wherein the mating elastic arm of the second ground terminal comprises a third branch arm, a fourth branch arm, and a second slit separating the third branch arm from the fourth branch arm; and wherein the first barrier is vertically inserted into the first slot, and the second barrier is vertically inserted into the second slot.

11. The electrical connector according to claim 10, wherein the first branch arm and the second branch arm extend into two adjacently disposed receiving spaces, respectively; and wherein the third branch arm and the fourth branch arm extend into two adjacently disposed receiving spaces, respectively.

12. An electrical connector assembly, comprising:

an electrical connector comprising:

a metal shell comprising a mounting surface; and a terminal module fixed to the metal shell, the terminal module comprising a plurality of conductive terminals, an insulating block fixing the plurality of conductive terminals, a ground shielding piece at least partially received in the insulating block, and a plurality of cables connected to the conductive terminals; and a circuit board on which the electrical connector is mounted, the circuit board comprising a plurality of conductive pads, the plurality of conductive pads comprising a plurality of pairs of differential signal conductive pads and a plurality of frame-shaped grounding pads, a periphery of each pair of differential signal conductive pads being surrounded by one frame-shaped grounding pad, the plurality of frame-shaped grounding pads are connected as a whole;

wherein the plurality of conductive terminals comprise a plurality of pairs of differential signal terminals, a plurality of first ground terminals and a plurality of second ground terminals, opposite sides of each pair of differential signal terminals are associated with one of the first ground terminals and one of the second ground terminals, respectively; the ground shielding piece connects the plurality of first ground terminals and the plurality of second ground terminals in series;

wherein each conductive terminal comprises a mating elastic arm protruding beyond the mounting surface, and the mating elastic arm comprises a contact portion; and wherein the contact portions of the pair of differential signal terminals press against corresponding differential signal conductive pads, and the contact portions of the first ground terminal and the second ground terminal press against a corresponding frame-shaped grounding pad.

13. The electrical connector assembly according to claim 12, wherein the circuit board is provided with a mounting hole, and the electrical connector assembly further comprises a mounting member which extends through the mounting hole and is fixed with the metal shell.

14. An electrical connector assembly, comprising:

an electrical connector comprising:

a metal shell comprising a mounting surface; and a terminal module fixed to the metal shell, the terminal module comprising a plurality of conductive terminals, an insulating block fixing the plurality of conductive terminals, and a plurality of cables connected to the plurality of conductive terminals; and a circuit board comprising a plurality of conductive pads;

wherein the plurality of conductive terminals comprise a plurality of pairs of differential signal terminals, a plurality of first ground terminals and a plurality of second ground terminals; opposite sides of each pair of differential signal terminals are associated with one of the first ground terminals and one of the second ground terminals, respectively; each conductive terminal comprises a mating elastic arm protruding beyond the mounting surface, and the mating elastic arm comprises a contact portion;

wherein the plurality of conductive pads comprise a plurality of pairs of differential signal conductive pads and a plurality of frame-shaped grounding pads, a periphery of each pair of differential signal conductive pads is surrounded by one frame-shaped grounding pad, the plurality of frame-shaped grounding pads are connected as a whole, the contact portions of the pair of differential signal terminals press against corresponding differential signal conductive pads, and the contact portions of the first ground terminal and the second ground terminal press against a corresponding frame-shaped grounding pad.

15. The electrical connector assembly according to claim 14, wherein a plurality of the terminal modules are provided and have a same structure; and wherein the terminal modules are assembled to the metal shell along a direction perpendicular to the circuit board.

16. The electrical connector assembly according to claim 14, wherein the plurality of cables connected to the conductive terminals extend in a direction perpendicular to the circuit board.

17. The electrical connector assemble according to claim 14, wherein the metal shell comprises a plurality of barrier portions, each barrier portion defines a receiving space extending through the mounting surface, and one of the plurality of pairs of differential signal terminals, one of the first ground terminals and one of the second ground terminals are located in each receiving space.

18. The electrical connector assembly according to claim 17, wherein each barrier portion comprises a first barrier, a second barrier opposite to the first barrier, a third barrier connecting one side of the first barrier and one side of the second barrier, and a fourth barrier connecting another side of the first barrier and another side of the second barrier;

wherein the mating elastic arm of the first ground terminal comprises a first branch arm, a second branch arm, and a first slit separating the first branch arm from the second branch arm;

wherein the mating elastic arm of the second ground terminal comprises a third branch arm, a fourth branch arm, and a second slit separating the third branch arm from the fourth branch arm; and wherein the first barrier is vertically inserted into the first slot, and the second barrier is vertically inserted into the second slot.

19. The electrical connector assembly according to claim 18, wherein the first branch arm and the second branch arm extend into two adjacently disposed receiving spaces, respectively; and wherein the third branch arm and the fourth branch arm extend into two adjacently disposed receiving spaces, respectively.

20. The electrical connector assembly according to claim 18, wherein at least one of the first barrier, the second barrier, the third barrier, and the fourth barrier is in contact with the one of the grounding pads.

* * * * *